United States Patent
Chen et al.

(10) Patent No.: US 11,675,083 B2
(45) Date of Patent: Jun. 13, 2023

(54) REMOVAL OF EPHEMERAL POINTS FROM POINT CLOUD OF A HIGH-DEFINITION MAP FOR NAVIGATING AUTONOMOUS VEHICLES

(71) Applicant: NVIDIA CORPORATION, Santa Clara, CA (US)

(72) Inventors: Chen Chen, San Jose, CA (US); Liang Zou, Sunnyvale, CA (US); Derik Schroeter, Fremont, CA (US); Mark Damon Wheeler, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 362 days.

(21) Appl. No.: 16/733,143

(22) Filed: Jan. 2, 2020

(65) Prior Publication Data
US 2020/0217964 A1    Jul. 9, 2020

Related U.S. Application Data

(60) Provisional application No. 62/788,073, filed on Jan. 3, 2019.

(51) Int. Cl.
*G01S 17/89* (2020.01)
*G05D 1/00* (2006.01)
(Continued)

(52) U.S. Cl.
CPC .............. *G01S 17/89* (2013.01); *B60W 50/00* (2013.01); *B60W 60/0027* (2020.02);
(Continued)

(58) Field of Classification Search
CPC ...... G01S 17/89; G01S 7/4808; B60W 50/00; B60W 60/0027; B60W 2050/0052;
(Continued)

(56) References Cited

U.S. PATENT DOCUMENTS 10,345,447 B1 * 7/2019 Hicks .................... G01S 7/486
2015/0356357 A1 * 12/2015 McManus .............. G06T 7/254
382/104
(Continued)

FOREIGN PATENT DOCUMENTS

CN          113168764 A  *  7/2021  ........... G08G 1/0112
WO    WO-2019092439 A1 *  5/2019  ............. G01S 17/86

OTHER PUBLICATIONS

Machine Translation: WO-2019092439-A1 (year:2019).*
Machine Translation: CN-113168764-A (year:2021).*

*Primary Examiner* — Aaron L Troost
*Assistant Examiner* — Connor L Knight
(74) *Attorney, Agent, or Firm* — Maschoff Brennan

(57) ABSTRACT

An autonomous vehicle system removes ephemeral points from lidar samples. The system receives a plurality of light detection and ranging (lidar) samples captured by a lidar sensor. Along with the lidar samples, the system receives an aligned pose and an unwinding transform for each of the lidar samples. The system determines one or more occupied voxel cells in a three-dimensional (3D) space using the lidar samples, their aligned poses, and their unwinding transforms. The system identifies occupied voxel cells representative of noise associated with motion of an object relative to the lidar sensor. The system filters the occupied voxel cells by removing the cells representative of noise. The system inputs the filtered occupied voxel cells in a 3D map comprising voxel cells, e.g., during the map generation and/or a map update.

25 Claims, 27 Drawing Sheets

(51) Int. Cl.
    *G05D 1/02*   (2020.01)
    *B60W 60/00*  (2020.01)
    *G06T 19/00*  (2011.01)
    *B60W 50/00*  (2006.01)
(52) U.S. Cl.
    CPC ......... *G05D 1/0088* (2013.01); *G05D 1/0231* (2013.01); *G06T 19/003* (2013.01); *B60W 2050/0052* (2013.01); *B60W 2420/52* (2013.01); *G05D 2201/0213* (2013.01)
(58) Field of Classification Search
    CPC ............ B60W 2420/52; G05D 1/0088; G05D 1/0231; G05D 2201/0213; G05D 1/0274; G06T 19/003; G06T 15/06; G06T 17/05; G06V 20/58
    See application file for complete search history.

(56) References Cited

U.S. PATENT DOCUMENTS

| | | | |
|---|---|---|---|
| 2018/0364717 A1* | 12/2018 | Douillard | G05D 1/024 |
| 2019/0120948 A1* | 4/2019 | Yang | G01S 17/931 |
| 2019/0258737 A1* | 8/2019 | Wang | G06V 20/56 |
| 2020/0098135 A1* | 3/2020 | Ganjineh | G06K 9/00818 |
| 2020/0109954 A1* | 4/2020 | Li | G05D 1/0274 |
| 2020/0150233 A1* | 5/2020 | Nian | G01S 17/931 |
| 2020/0158869 A1* | 5/2020 | Amirloo Abolfathi | G01S 17/42 |

* cited by examiner

REMOVAL OF EPHEMERAL POINTS FROM POINT CLOUD OF A HIGH-DEFINITION MAP FOR NAVIGATING AUTONOMOUS VEHICLES

CROSS REFERENCE TO RELATED APPLICATIONS

This application claims the benefit of and priority to U.S. Provisional Application No. 62/788,073, filed on Jan. 3, 2019, which is incorporated herein by reference.

BACKGROUND

This disclosure relates generally to maps for autonomous vehicles, and more particularly to removing dynamic objects from point clouds to generate a point cloud representation for a high-definition map.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. However conventional maps have several drawbacks that make them difficult to use for an autonomous vehicle. For example, maps do not provide the level of accuracy required for safe navigation (e.g., 10 cm or less). GPS systems provide accuracies of approximately 3-5 meters, but have large error conditions resulting in an accuracy of over 100 m. This makes it challenging to accurately determine the location of the vehicle.

Furthermore, conventional maps are created by survey teams that use drivers with specially outfitted cars with high resolution sensors that drive around a geographic region and take measurements. The measurements are taken back and a team of map editors assembles the map from the measurements. This process is expensive and time consuming (e.g., taking possibly months to complete a map). Therefore, maps assembled using such techniques do not have fresh data. For example, roads are updated/modified on a frequent basis roughly 5-10% per year. But survey cars are expensive and limited in number, so cannot capture most of these updates. For example, a survey fleet may include a thousand cars. For even a single state in the United States, a thousand cars would not be able to keep the map up-to-date on a regular basis to allow safe self-driving. As a result, conventional techniques of maintaining maps are unable to provide the right data that is sufficiently accurate and up-to-date for safe navigation of autonomous vehicles.

One problem encountered while building maps is that sensor data captured for a region may include objects that are moving, such as cars, pedestrians, bicyclists, and so on. These objects should not be represented in a map of a region since these objects are ephemeral. A system generating map data from such sensor data needs to identify and remove such non-stationary objects from the input. A system may use machine learning based techniques to determine whether an object is stationary or non-stationary. Such techniques require extensive training of such models to achieve accurate results. Furthermore, use of such models to process sensor data may be computationally expensive.

SUMMARY

An autonomous vehicle system comprises a light detection and ranging (lidar) sensor that captures lidar samples for use in generating three-dimensional (3D) maps of one or more environments. The system aims to remove ephemeral points from the lidar samples corresponding to one or more dynamic objects in an environment that are in motion relative to the lidar sensor. Examples of dynamic objects include other vehicles, pedestrians, bicyclists and so on. These are distinct from stationary objects such as buildings, poles, trees, traffic signs, and so on. The system receives a plurality of lidar samples captured by a lidar sensor, each lidar sample associated with an aligned pose and an unwinding transform. The system determines one or more occupied voxel cells in a 3D space using the lidar samples, their aligned poses, and their unwinding transforms. The system identifies occupied voxel cells representative of noise associated with motion of an object relative to the lidar sensor. The system filters the occupied voxel cells by removing the cells representative of noise. The system inputs the filtered occupied voxel cells in a 3D map comprising voxel cells, e.g., during the map generation and/or a map update.

In one embodiment of identifying occupied voxel cells representative of noise, the system considers an occupied voxel cell and searches for nearby lidar samples with a search radius. For each lidar sample, the system projects the occupied voxel into the range image of the lidar sample. Responsive to determining that the projected range is less than or equal to the pixel range, the system identifies that occupied voxel cell as representative of noise.

In a different embodiment, the system considers a lidar sample and searches for nearby occupied voxel cells with a search radius. The system projects each identified occupied voxel into the range image of the lidar sample. Responsive to determining that the projected range is less than or equal to the pixel range, the system identifies those voxel cells as representative of noise.

BRIEF DESCRIPTION OF THE DRAWINGS

Figure (FIG.) 1 shows the overall system environment of an HD map system interacting with multiple vehicle computing systems, according to an embodiment.

Figure 1:
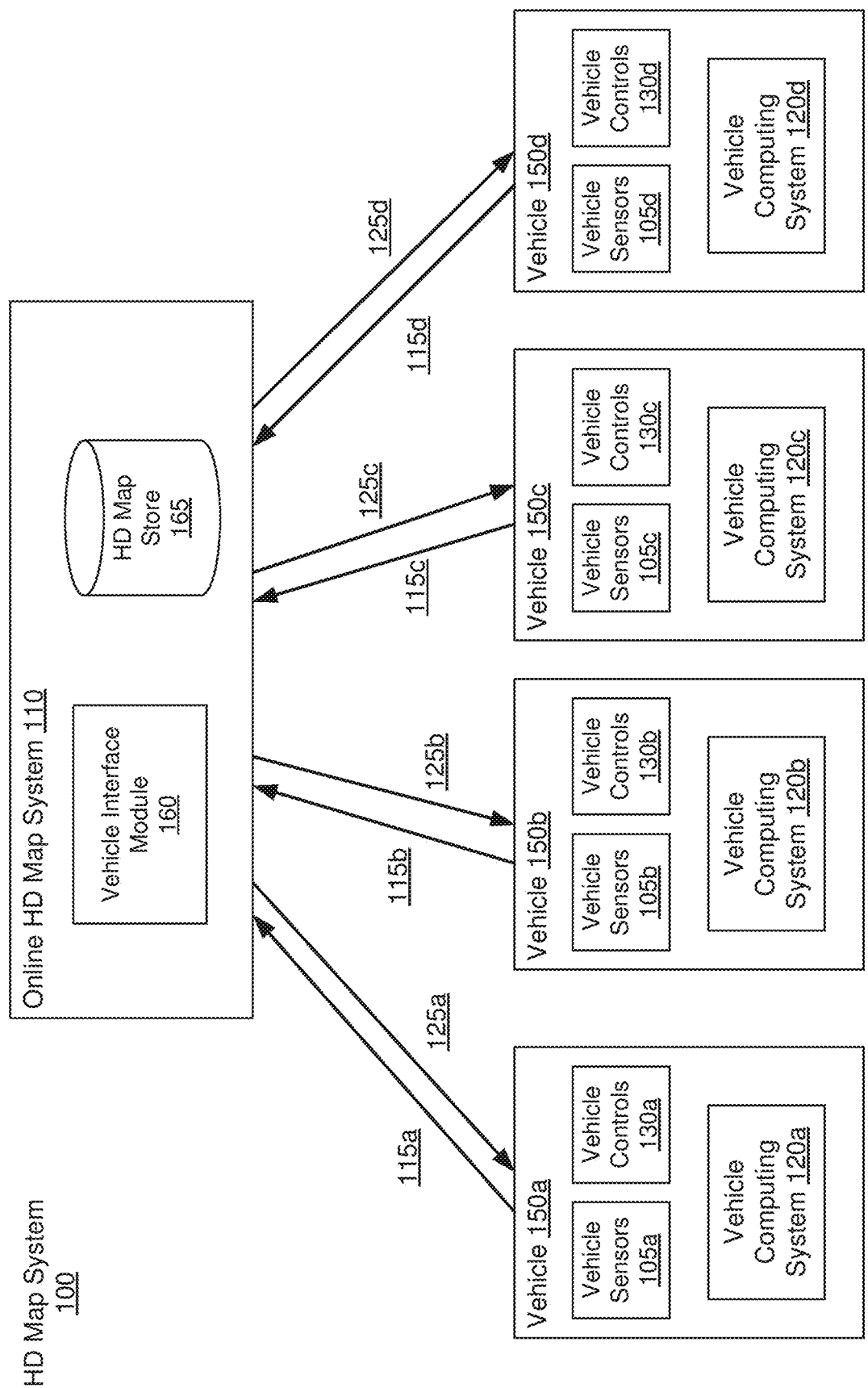

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time-consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments generate and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing high latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
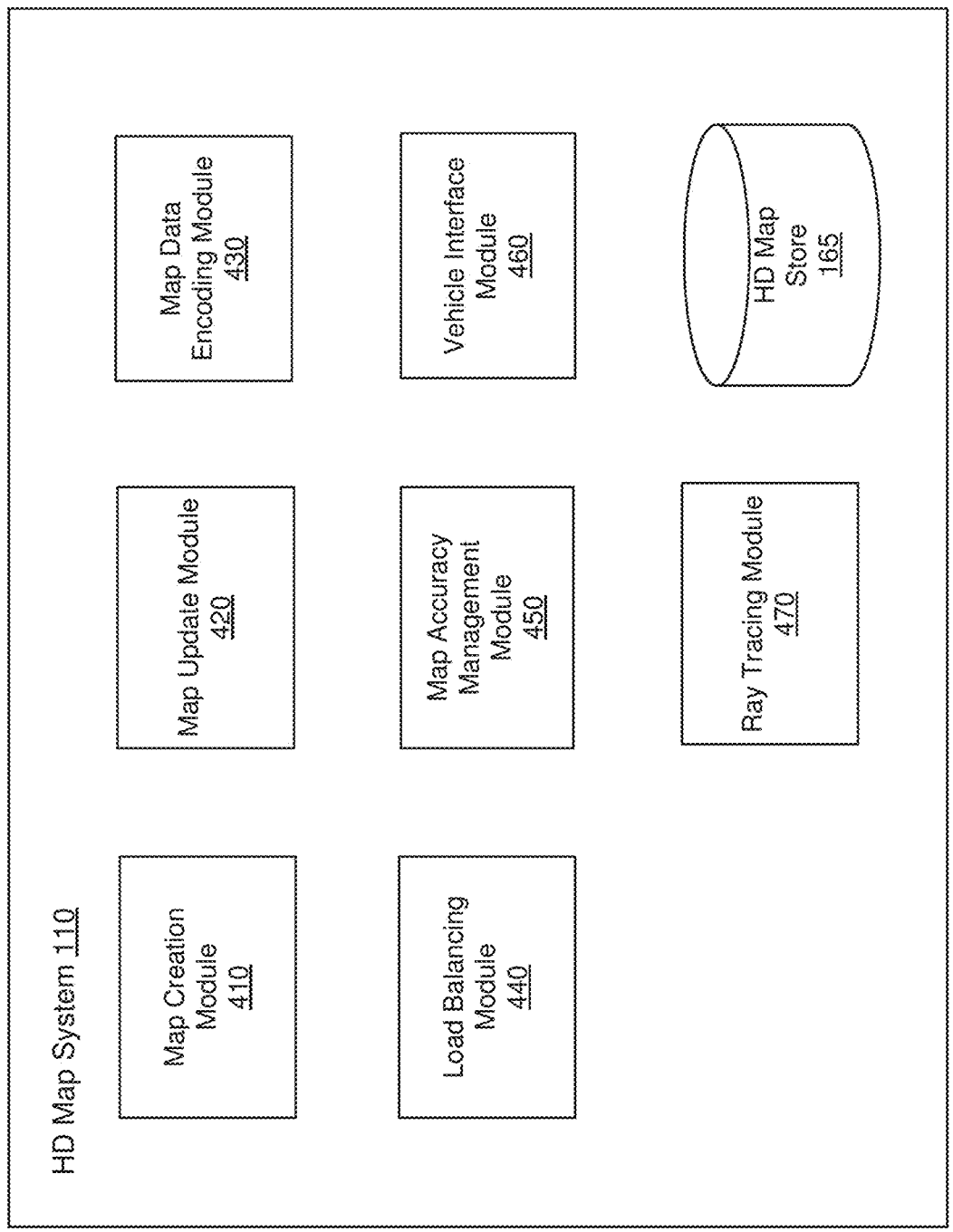
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (lidar), a global positioning system (GPS) navigation system, an inertial measurement unit (IMU), and others. The vehicle has one or more cameras that capture images of the surroundings of the vehicle. A lidar surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
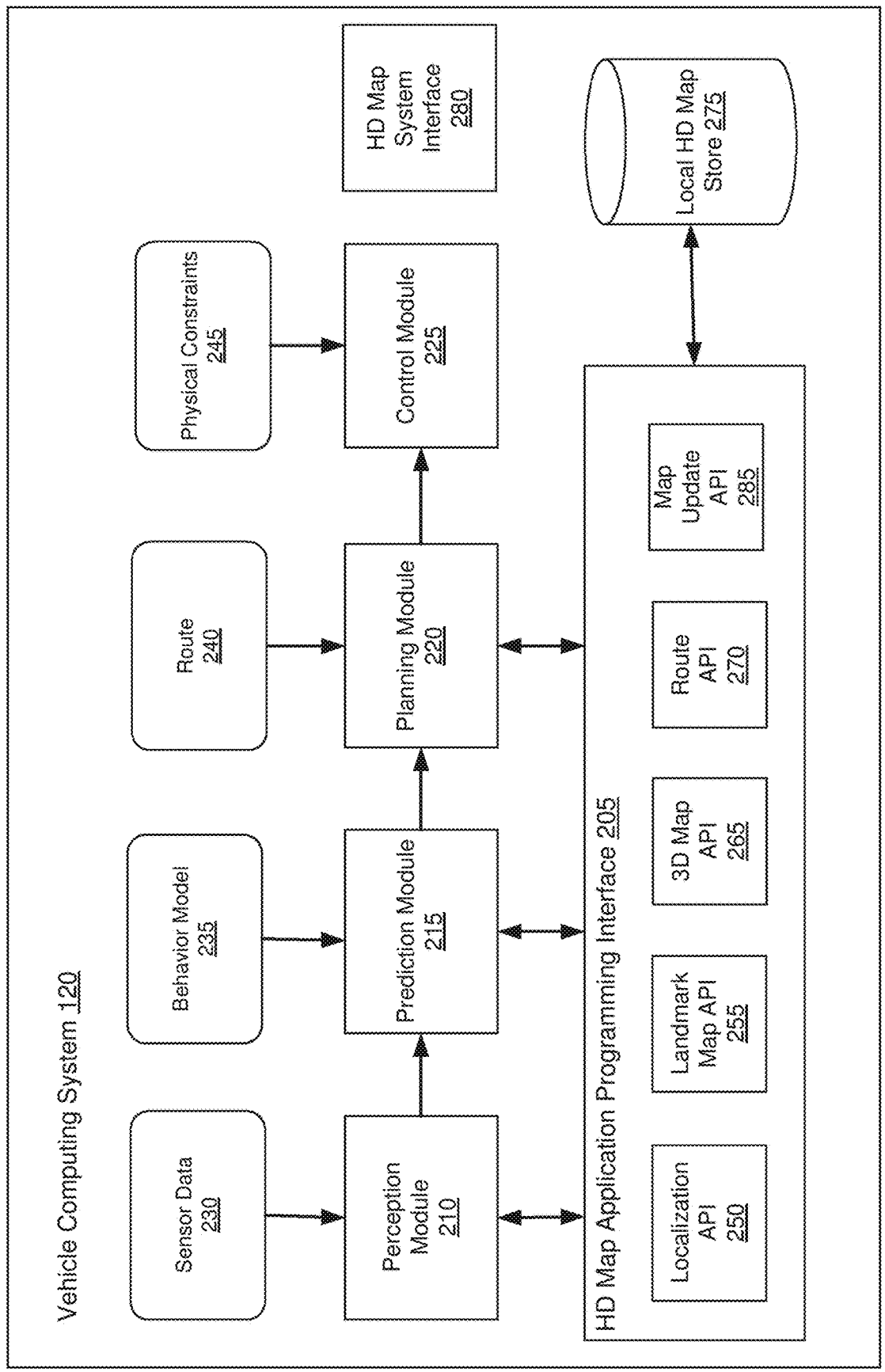
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, lidar, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, lidar scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the lidar using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

FIG. 4 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
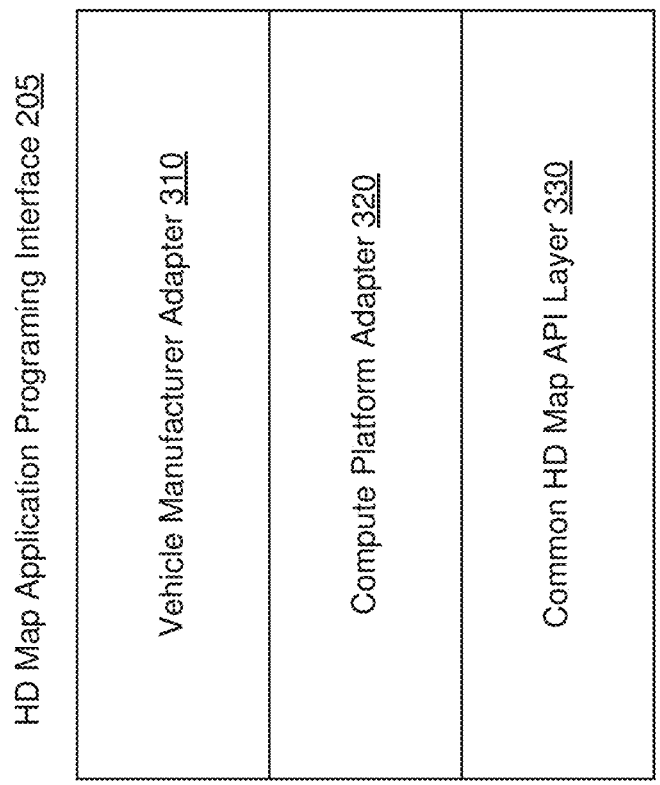
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a compute platform adapter 320, and a common HD map API layer 330. The common HD map API layer comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module 450, a vehicle interface module 460, a ray tracing module 470, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

The ray tracing module 470 processes lidar samples captured by vehicle sensors. The ray tracing module 470 may use one or more ray tracing algorithms to filter noise (e.g., ephemeral points) of a HD map generated using the lidar samples. For example, the HD map may be an occupancy map, which is further described below.

Figure 5:
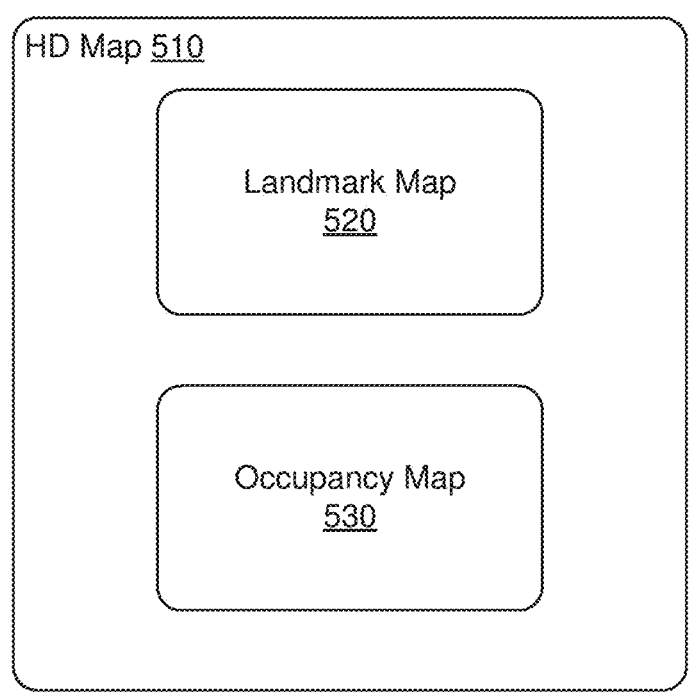
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells (e.g., voxel cell) at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6B:
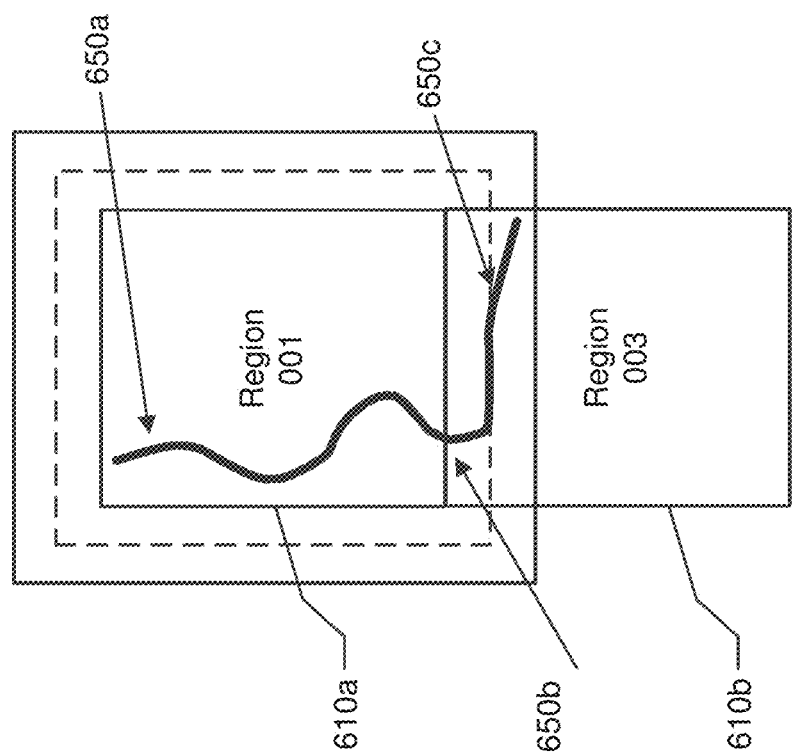
FIGS. 6A and 6B illustrate geographical regions defined in an HD map, according to an embodiment.
Figure 6A:
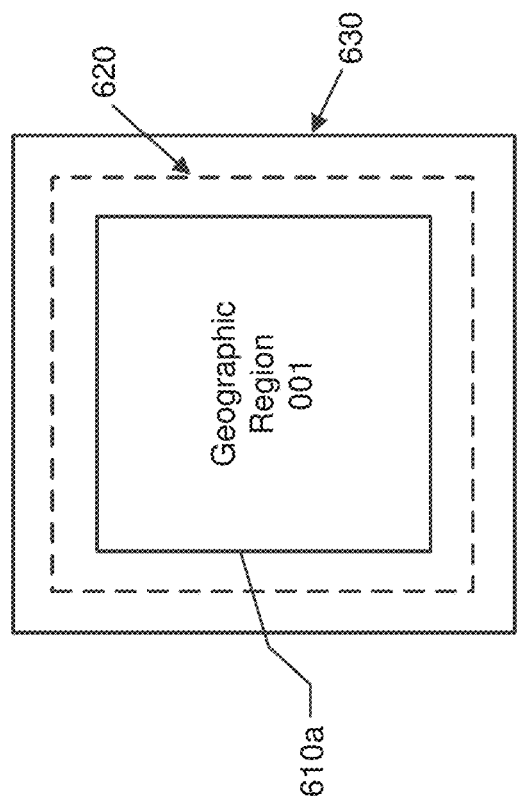

FIGS. 6A and 6B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it cross the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
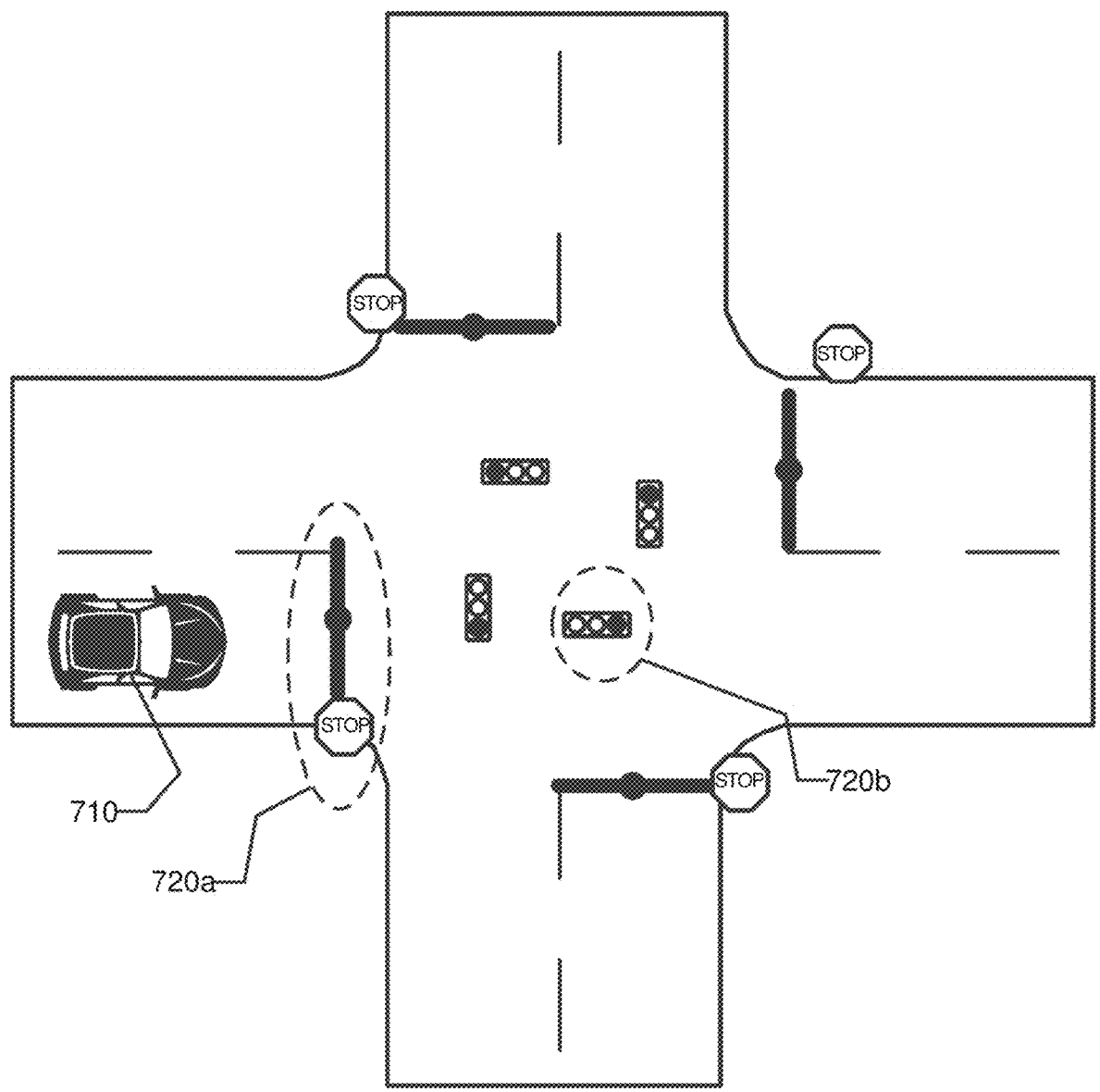
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
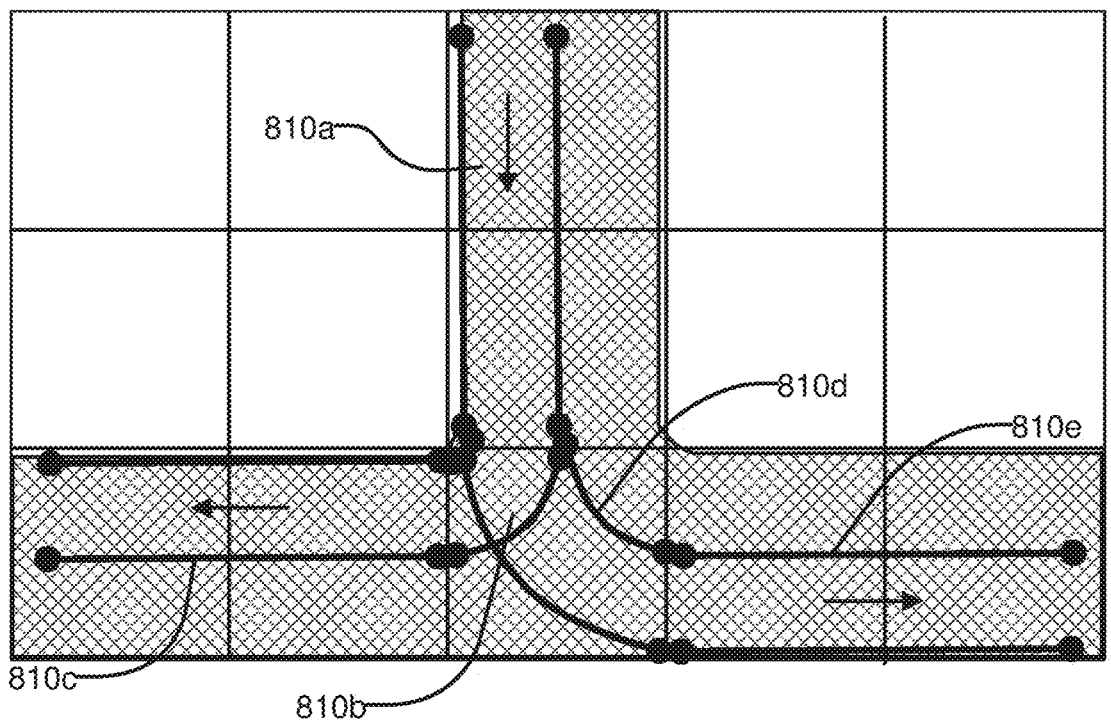
FIGS. 8A and 8B illustrates lane elements and relations between lane elements in an HD map, according to an embodiment.
Figure 8B:
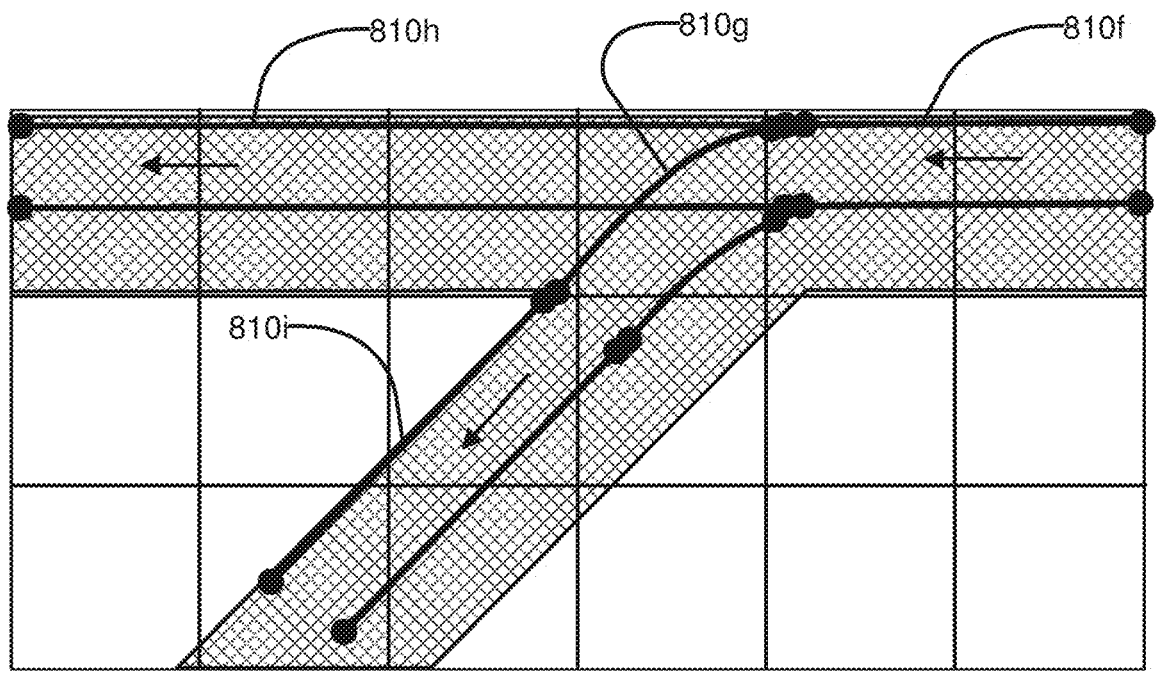

FIGS. 8A and 8B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Ray Tracing

Figure 9:
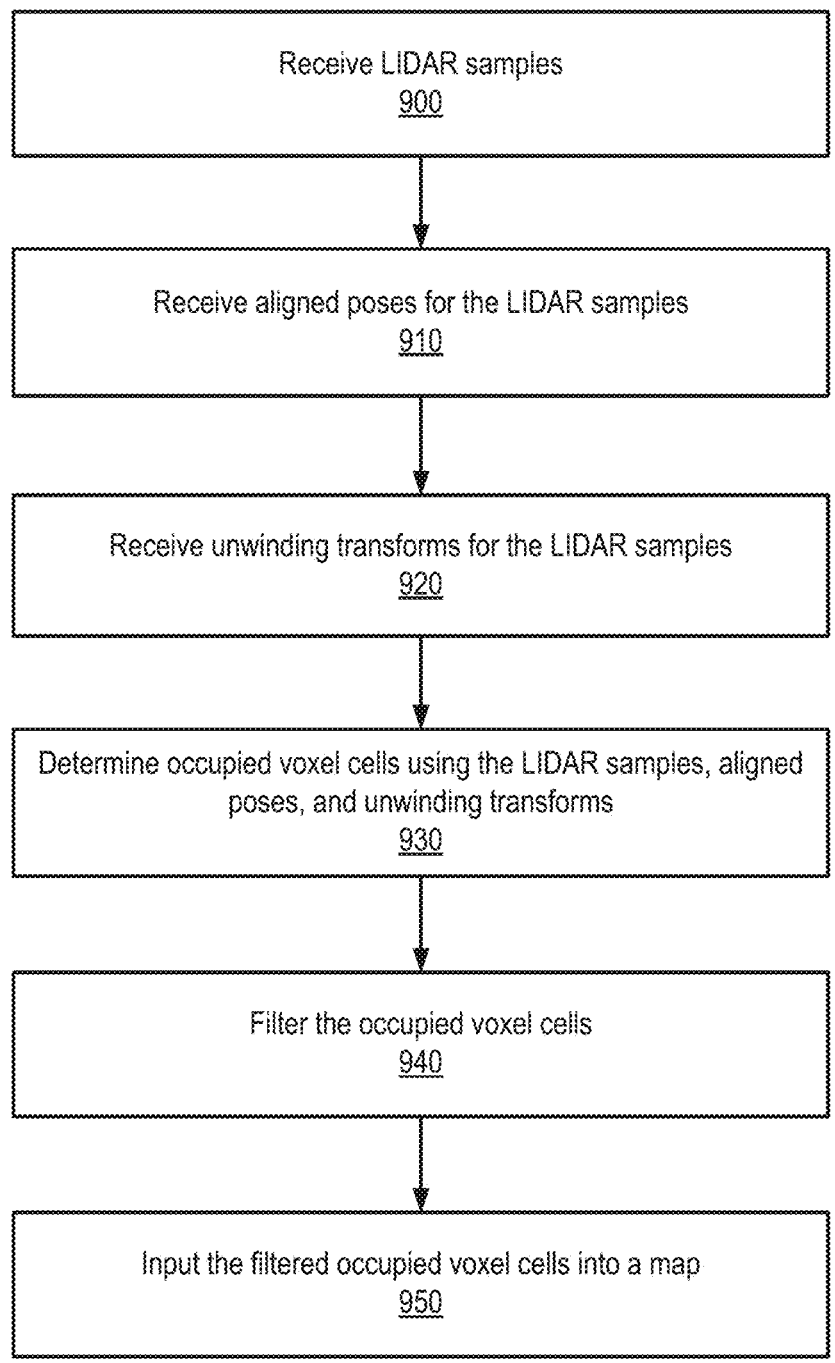
FIG. 9 is a flowchart of a method for processing light detection and ranging (lidar) samples according to one embodiment.

FIG. 9 is a flowchart of a method for processing lidar samples according to one embodiment. lidar vehicle sensors of a vehicle may detect dynamic objects, e.g., other vehicles, bicyclists, or pedestrians that are moving. lidar samples from a lidar scan may include ephemeral points resulting from motion of the objects. The ray tracing module 470 of the HD Map System 110 may identify and remove one or more ephemeral points from an occupancy map generated using sensor data from the lidar scan. In various embodiments, a laser of a lidar sensor may continuously rotate (e.g., about an axis perpendicular to a ground plane) for a period of time to capture lidar samples. A lidar scan may include samples captured during a 360-degree rotation of the laser. A lidar sample may include row and column data, where rows encode yaw angles of the laser, and columns encode pitch angles of the laser (or vice versa).

In an embodiment, the ray tracing module 470 receives 900 as input N lidar samples in a local sector coordinate system. The lidar samples may be captured by a lidar sensor of a vehicle. The lidar samples may originate from one or more different tracks. The ray tracing module 470 receives 910 aligned poses $T_i$, (i ε 1 . . . N) for each lidar sample. Additionally, the ray tracing module 470 receives 920 corresponding unwinding transforms $T_i^{unwind}$ for each lidar sample. The unwinding transforms account for rotation of the laser and are further described below with reference to FIG. 10.

The ray tracing module 470 determines 930 occupied voxels ($V_0$) using the lidar samples, aligned poses, and unwinding transforms. A voxel (also referred to herein as a cell or voxel cell), represents a value in 3D space. The 3D space may be associated with an occupancy map of a HD map. As previously described with respect to FIG. 5, the 3D space may indicate likelihood of one or more objects existing at a particular location corresponding to a voxel. In other words, the voxels may indicate presence of at least one object in vicinity of a lidar sensor or vehicle. In some embodiments, the ray tracing module 470 determines that a voxel is an occupied voxel responsive to determining that the likelihood (or confidence score) of one or more objects existing at the corresponding location is greater than a threshold likelihood (or score). In an embodiment, each occupied cell is a voxel cell including one or more lidar samples according to aligned poses and unwinding transforms, wherein an occupied voxel cell containing multiple lidar samples occurs when the multiple lidar samples correspond to at least one object existing at the particular location corresponding to the voxel.

The ray tracing module 470 filters 940 the occupied voxel cells. For example, the ray tracing module 470 identifies one or more occupied voxel cells having dynamic objects or ephemeral point(s). An ephemeral point may represent a voxel occupied by a dynamic object during motion of the object or the vehicle (having the vehicle sensors). A set of ephemeral points may indicate a path of motion of the object relative to the vehicle. The ray tracing module 470 removes the identified one or more occupied voxel cells having ephemeral point(s), e.g., from a set of processed voxel cells.

In one embodiment of the filtering, the ray tracing module 470 processes a given occupied voxel cell $v_i$ by searching nearby samples $S(v_i) \geq 9$ Neighbor$_R(v_i)$ with a search radius R. In an embodiment, the ray tracing module 470 filters the set of occupied voxel cells as follows. The ray tracing module 470 identifies a lidar sample based on a lidar within a threshold distance of the occupied voxel cell. The ray tracing module 470 determines whether a point observed by the lidar using a ray passing through the occupied voxel cell is further than the occupied voxel cell. Accordingly, the ray tracing module 470 determines whether a point in a range image captured by the lidar is further than the occupied voxel cell such that the occupied voxel cell lies on a ray traced from the lidar to the point of the image. If the ray tracing module 470 determines that the point observed by the lidar is further than the occupied voxel cell, the ray tracing module 470 removes the occupied voxel cell from the set of occupied voxel cells since the occupied cell represents a dynamic object that cannot be observed in at least a lidar sample.

In an embodiment, for each sample $s_i \in S(v_i)$, the ray tracing module 470 projects $v_i$ into the range image of $s_i$. Responsive to determining that projected range($v_i$)≤actual pixel range($s_i$), the ray tracing module 470 removes the voxel cell $v_i$. The ray tracing module 470 may repeat the above steps for multiple or all occupied voxel cells $v_i$ determined in step 930.

In a different embodiment of the filtering, the ray tracing module 470 processes a lidar sample s by searching nearby occupied voxel cells with a search radius. For each nearby occupied voxel $v_i$, responsive to determining that the voxel is marked as erased, the ray tracing module 470 projects $v_i$ into the range image of s. Responsive to determining that projected range($v_i$)≤actual pixel range($s_i$), the ray tracing module 470 removes the voxel cell $v_i$. The ray tracing module 470 may repeat the above steps for multiple or all lidar samples received.

The ray tracing module 470 inputs 950 the filtered occupied voxel cells in a 3D map (e.g., occupancy map or HD map). Inputting the filtered occupied voxel cells may occur during map generation or a map update. For example, the ray tracing module 470 updates an existing map to indicate voxel cells that are open (i.e., not occupied) or occupied, which may indicate location of objects in an environment imaged by lidar scans. Responsive to determining that at least some of the filtered occupied voxel cells are associated with a given location not previously imaged, the ray tracing module 470 may generate a map of the given location or expand an existing map to cover the given location.

In some embodiments, to improve ray tracing of maps, the ray tracing module 470 may project beams at large depth discrepancy, use prior estimation of the sky for a point with no return (e.g., since laser beam projected into the sky may not have pulses reflected from an object), or use a cone-like structure instead of single ray for processing.

In an embodiment, the ray tracing module 470 filters out occupied voxels that map regions through which a vehicle drove. The ray tracing module 470 determines the location of the lidar in the lidar sample and an approximate volume occupied by the vehicle in the neighborhood of the lidar. The ray tracing module 470 filters out the voxels that correspond to the vehicle itself. This is so because there can\not be any stationary object in the voxels through which the vehicle passed. The ray tracing module 470 performs this filtering for all lidar samples.

Figure 10:
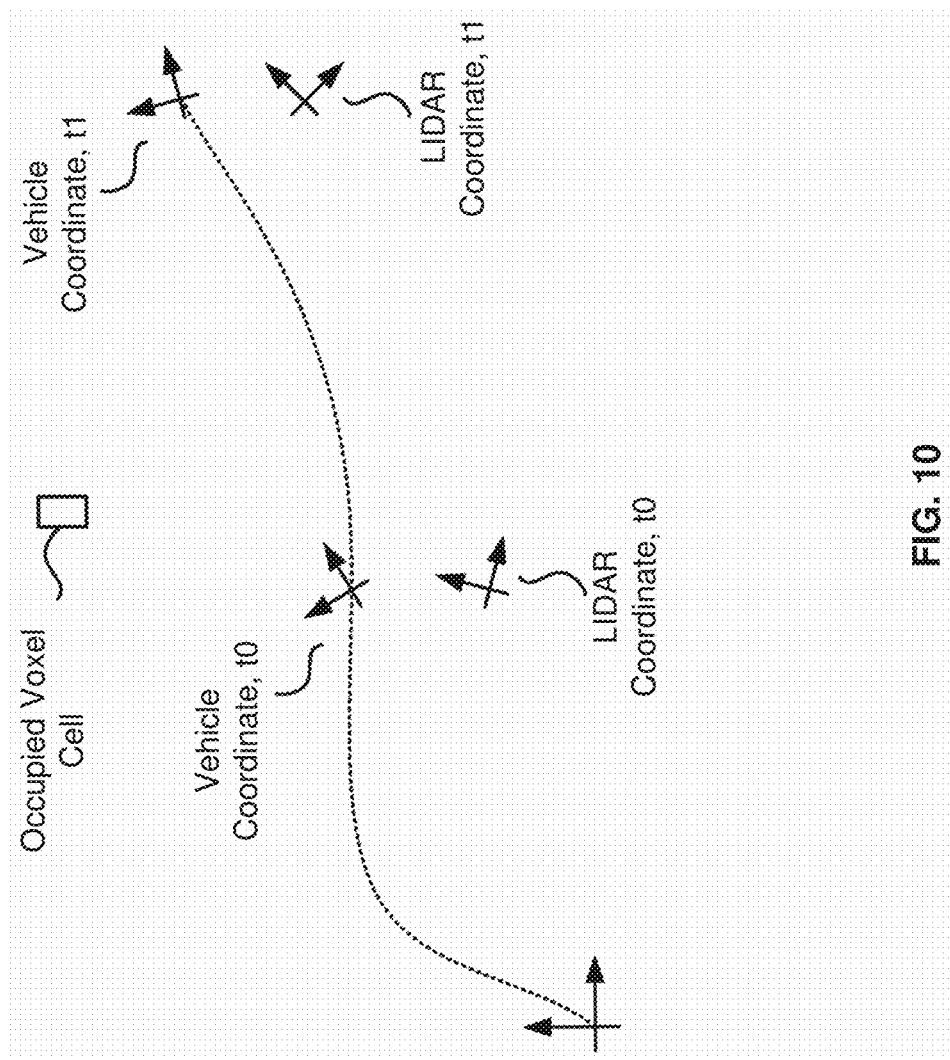
FIG. 10 illustrates coordinate systems for processing voxel cells according to one embodiment.

FIG. 10 illustrates coordinate systems for processing voxel cells according to one embodiment. To account for motion of detected objects relative to a vehicle, the ray tracing module 470 may project the motion onto a 2D plane and "unwind" a point cloud of a voxel cell, e.g., using an unwinding transform. To project an occupied cell $v_i$ during unwinding, the ray tracing module 470 may use both a lidar (e.g., local sector) coordinate system and a vehicle coordinate system. Since the laser of the lidar sensor moves (e.g., rotates relative to the vehicle) between the scan time window $[t_0, t_1]$, the ray tracing module 470 adjusts a center-point of the lidar sensor according to an arbitrary time $t \in [t_0, t_1]$. In particular, the ray tracing module 470 may determine a yaw angle of the lidar that corresponds to the actual projection of $v_i$ in the range image, given time t. The ray tracing module 470 may use the yaw angle (or column index) to determine the corresponding row index by checking the pitch angle of the lidar.

The ray tracing module 470 may merge unwound voxel cells into a 3D voxel grid according to corresponding poses of the voxel cells. When projecting a voxel in a local sector coordinate into a lidar range image, the ray tracing module 470 may account for one or more variables including, e.g., voxel center in local sector coordinate ($v_i$), lidar to vehicle transformations ($T_{LV}$), unwinding transform in a vehicle coordinate system ($T_V^{unwind}$), and lidar sample pose in local sector coordinate system ($T_{local}$), occupied cell coordinates in a local sector coordinate system, and begin and/or end time of a lidar scan ($t_0, t_1$).

Figure 11A:
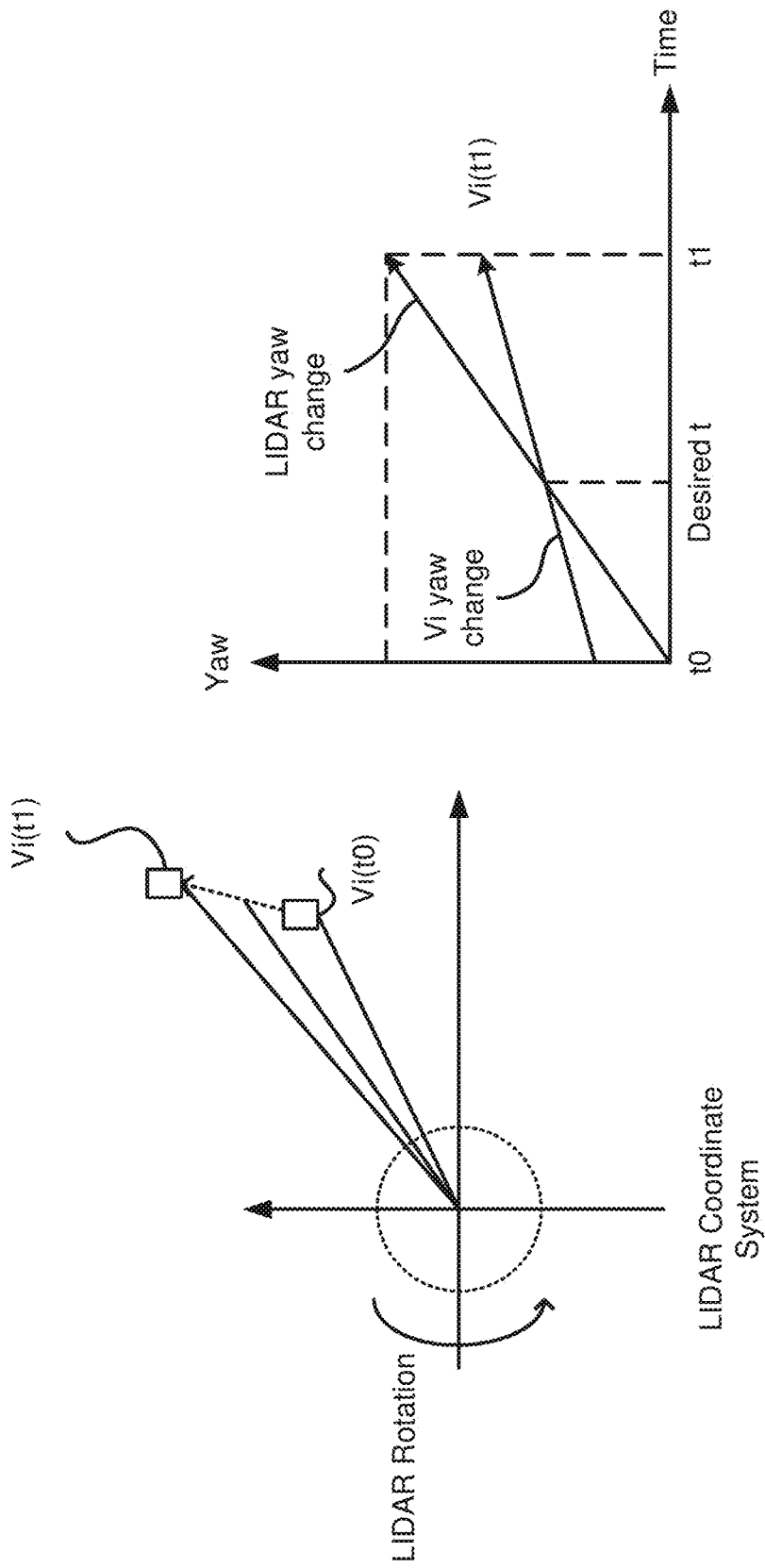
FIGS. 11A and 11B illustrate modeling of motion of voxel cells according to various embodiments.
Figure 11B:
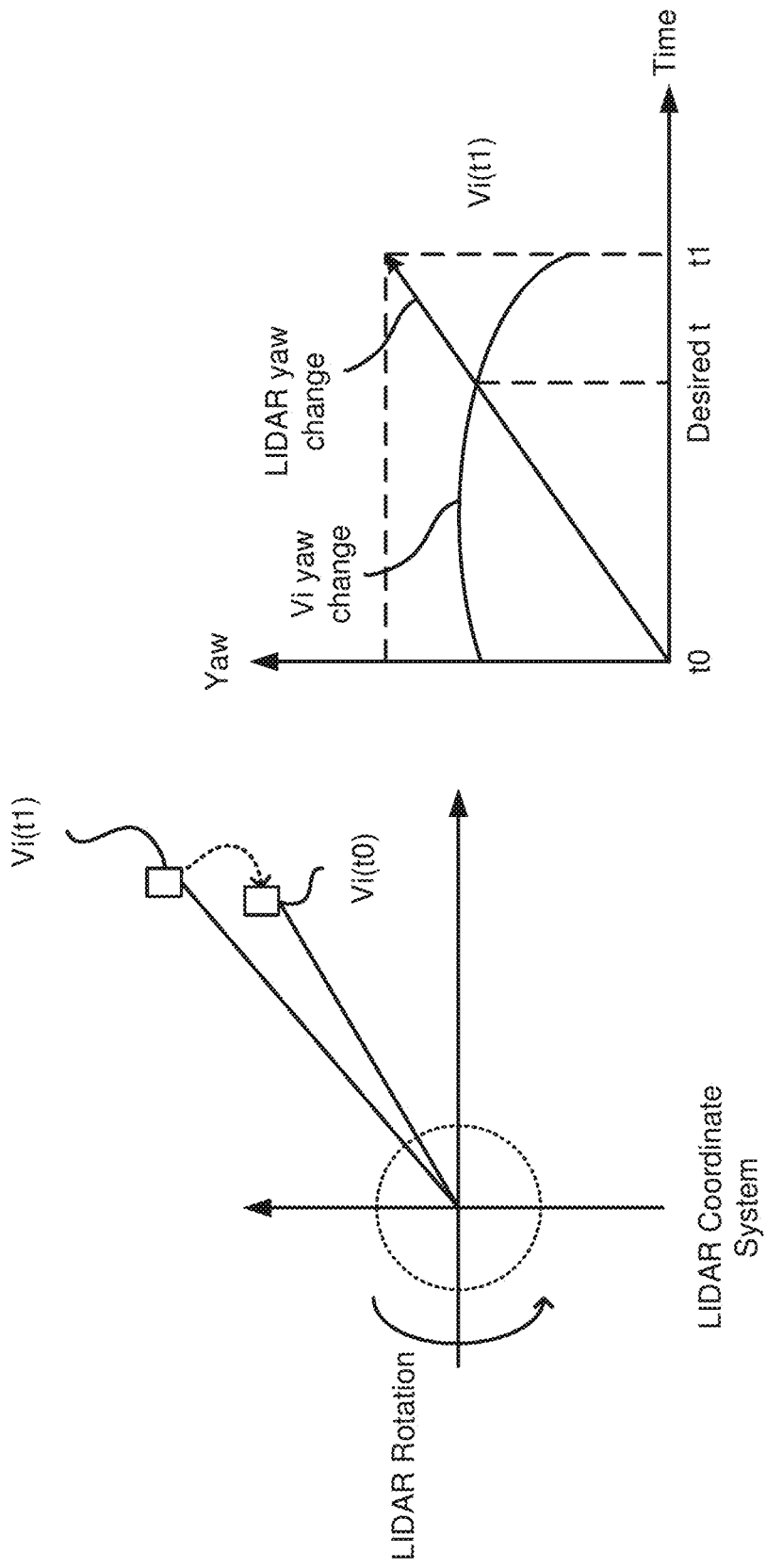

FIGS. 11A and 11B illustrate modeling of motion of voxel cells according to various embodiments. To determine projections of voxels, the ray tracing module 470 may assume that a lidar sensor of a vehicle does not move, but rather that the environment around the vehicle moves relative to the lidar sensor. In an embodiment, the ray tracing module 470 uses linear interpolation to perform unwinding transforms. As shown in the example of FIG. 11A, the motion of a voxel cell may lie on a line segment. By modeling a line connecting start and end points about an origin point of the lidar sensor, the ray tracing module 470 determines a projected yaw index is to search inside a yaw search window. The ray tracing module 470 may determine the yaw column that the actual yaw of $v_i$ is closest to predefined lidar yaw:

$$t = \underset{t}{\operatorname{argmin}} \left| lidar^{yaw}(t) - v_i^{yaw}(t) \right|, \text{ where}$$

$$t \in [t_{min}^{search\,window}, t_{max}^{search\,window}]$$

Given the determined time t to project $v_i$, the ray tracing module 470 may use the location of $v_i$ in lidar coordinate system to determine pitch angle. Thus, the ray tracing module 470 may determine a row and column index of a projected pixel in an image of the lidar sample. The row and column index may be associated by the intersection of line segments in yaw graph at a desired time t as shown in FIG. 11A.

In an embodiment, the ray tracing module 470 determines the start and end points of $v_i$ in the lidar coordinate system using linear interpolation of the points relative to the origin point of the lidar sensor as an approximation:

$$v_i^{LiDAR}(t_0) = (T_{local} \cdot T_{LV})^{-1} \cdot v_i^{local\,sector}$$

$$v_i^{LiDAR}(t_1) = (T_{local} \cdot T^{unwind} \cdot T_{LV})^{-1} \cdot v_i^{local\,sector}$$

In addition to approximation by linear interpolation, the ray tracing module 470 may use unwinding transforms for one or more (or all) columns from time range $[t_0, t_1]$. The ray tracing module 470 may interpolate using the identity transform to the unwinding transform:

$$T^{unwind}(r)=[R(r), t(r); 0, 1],$$

where $r \in [t_0, t_1]$

In an embodiment, the ray tracing module 470 uses the inverse of the unwinding transform, where the rotation component interacts with the translation component representing movement of the environment relative to the lidar sensor:

$$[T^{unwind}(r)]^{-1}=[R^{-1}(r), -R^{-1}(r)t(r); 0, 1],$$

where $r \in [t_0, t_1]$

The translation component of the transform $-R^{-1}(r)t(r)$ may be nonlinear. The ray tracing module 470 may use piecewise line segments to approximate the rotation, which is further described below with reference to FIG. 11B.

As shown in the example of FIG. 11B, the ray tracing module 470 may improve approximation of motion of $v_i$ using a piecewise line segment. For example, instead of solving for intersection of line segments, the ray tracing module 470 may solve for intersection of a line with a piecewise linear curve. In an embodiment, the ray tracing module 470 uses a window of 10 samples for driving scenarios, that is, the time range $[t_0, t_1]$ may be divided into 10 windows of sample data. In other embodiments, the time range may be divided into 20, 50, 100, or any other suitable number of windows. The ray tracing module 470 may model the piecewise linear curve using line segments to approximate motion of $v_i$ due to lidar unwinding for each window.

Figure 12:
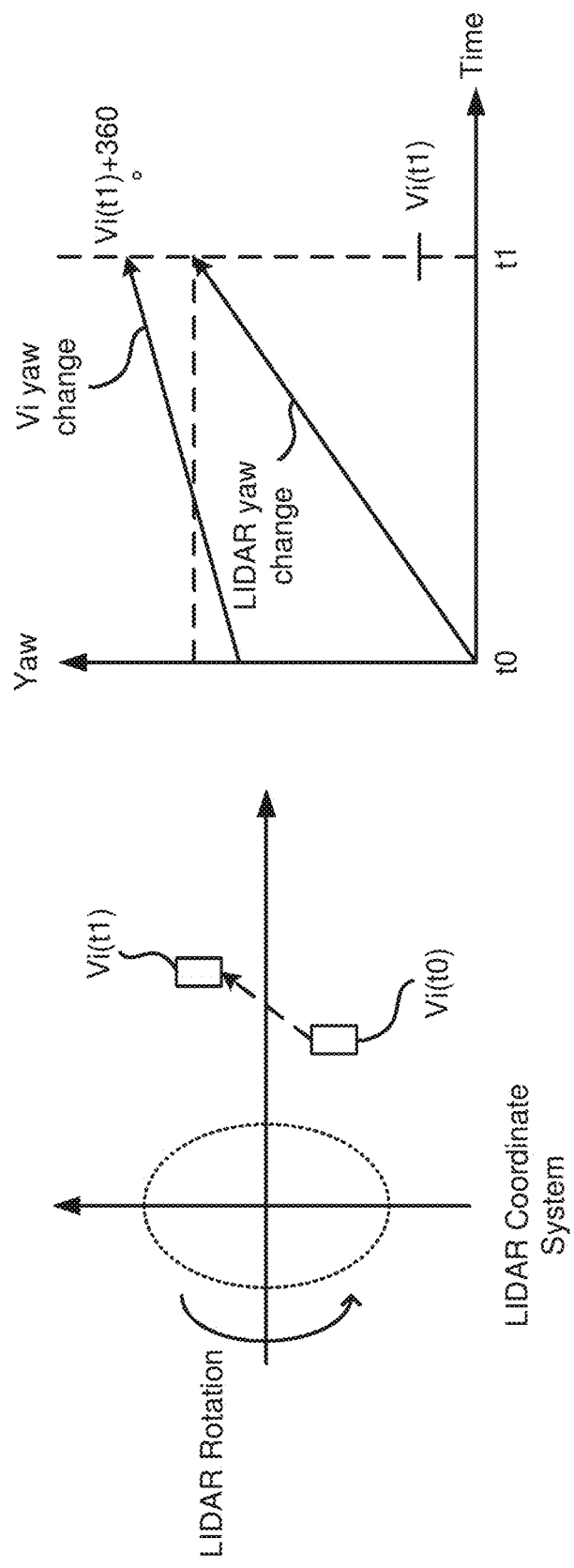
FIG. 12 is another illustration of modeling of motion of a voxel cell according to one embodiment.

FIG. 12 is another illustration of modeling of motion of a voxel cell according to one embodiment. In use cases where the yaw component of $v_i$ does not cross yaw value of 0 (e.g., horizontal axis shown in FIG. 12) on the lidar coordinate system, there is an intersection within range $[t_0, t_1]$ between the lines representing lidar_yaw(t) and $v_i$ since lidar yaw sweeps from 0°→360°. Thus, the ray tracing module 470 can determine a solution corresponding to the intersection of the lines.

In other use cases as shown in FIG. 12, $v_i$ crosses the yaw value of 0. For example, yaw of $v_i$ changes from less than $2\pi$ to greater than 0. Since angles can be rounded by 2p90 , the line segments may have no intersection between $[t_0, t_1]$. Thus, the lack of intersection (e.g., solution) indicates that $v_i$ may not visible to the lidar sensor because the motion is within a "blind spot" of the lidar sensor. In other use cases, there may be multiple solutions if the lidar sensor detects multiple instances of an object due to motion of the object and/or lidar sensor. Responsive to determining that the number of solutions (e.g., intersections) is different than one, the ray tracing module 470 may determine to process another lidar sample, e.g., determined to have one intersection of the lines. The ray tracing module 470 may determine to not update or generate a map using the lidar samples having a number of solutions different than one.

In some embodiments, the ray tracing module 470 performs lidar calibration to improve accuracy of pitch and yaw calculations. For example, the lidar calibration may account for discrepancies in positioning of a laser from a "true center" or origin point of the lidar sensor. This ray tracing module 470 may use one or more calibration parameters including, for example, rotation correction (hc), vertical correction (pitch), distance correction (dc), vertical offset correction (v), horizontal offset correction (h), among other types of parameters.

Figure 13:
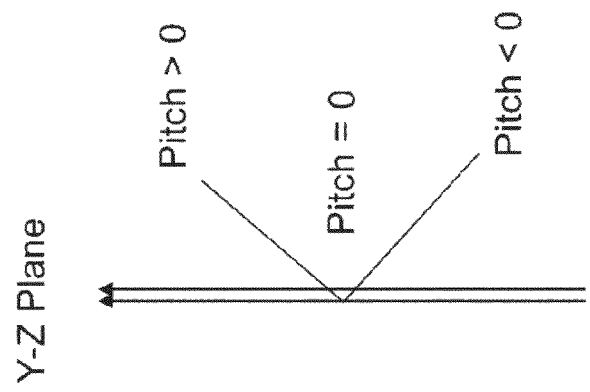
FIG. 13 illustrates a lidar coordinate system according to one embodiment.
Figure 13:
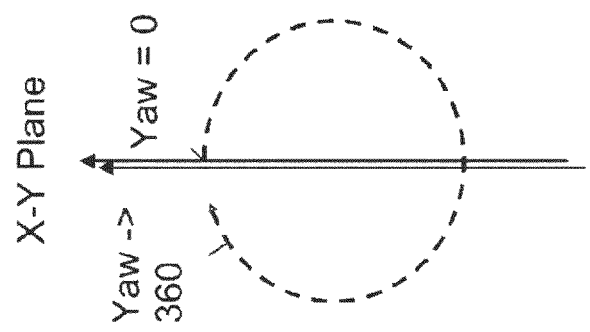

FIG. 13 illustrates a lidar coordinate system according to one embodiment. In an embodiment, the ray tracing module 470 determines pitch and yaw angles in the lidar coordinate system as follows:

$$\text{pitch} = \arctan\frac{z}{\sqrt{x^2+y^2}} \quad \text{if } x \geq 0,$$

$$\text{yaw} = \arccos\frac{y}{\sqrt{x^2+y^2}} \quad \text{if } x < 0,$$

$$\text{yaw} = 2\pi - \arccos\frac{y}{\sqrt{x^2+y^2}}$$

Figure 14:
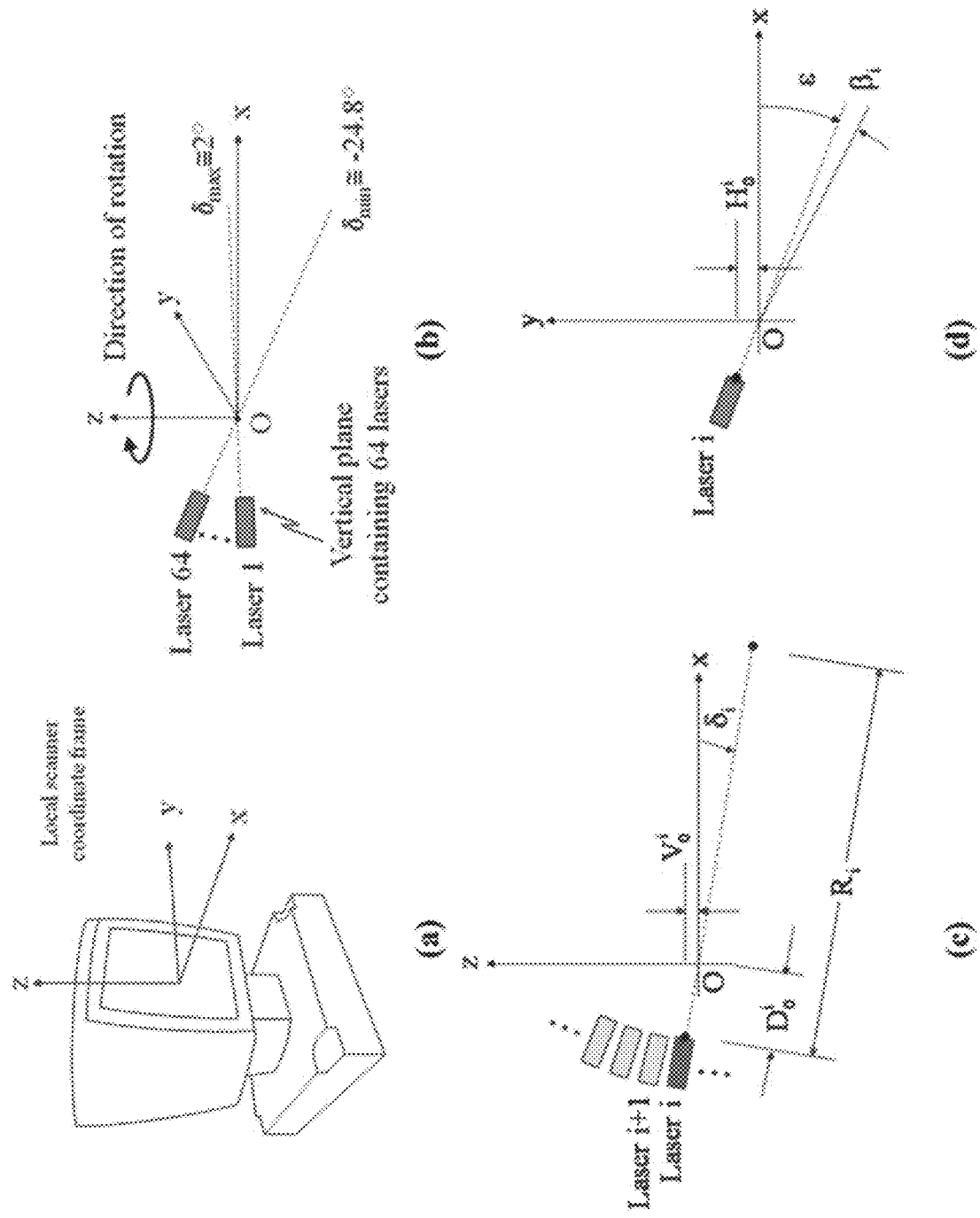
FIG. 14 illustrates modeling of motion of lidar sensors according to one embodiment.
Figure 15A:
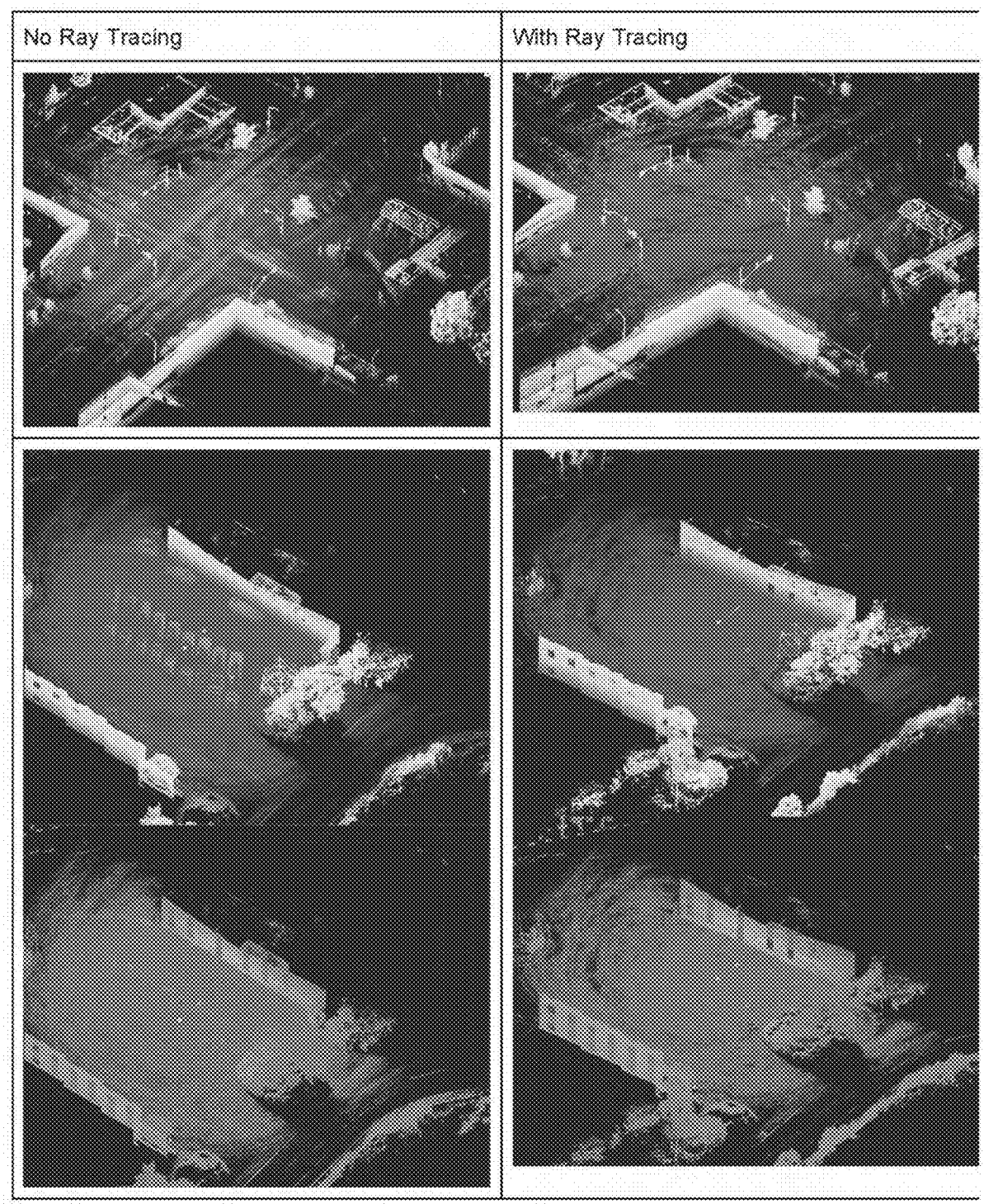
FIGS. 15A, 15B, 15C, 15D, and 15E illustrate images processed using ray tracing according to various embodiments.
Figure 15B:
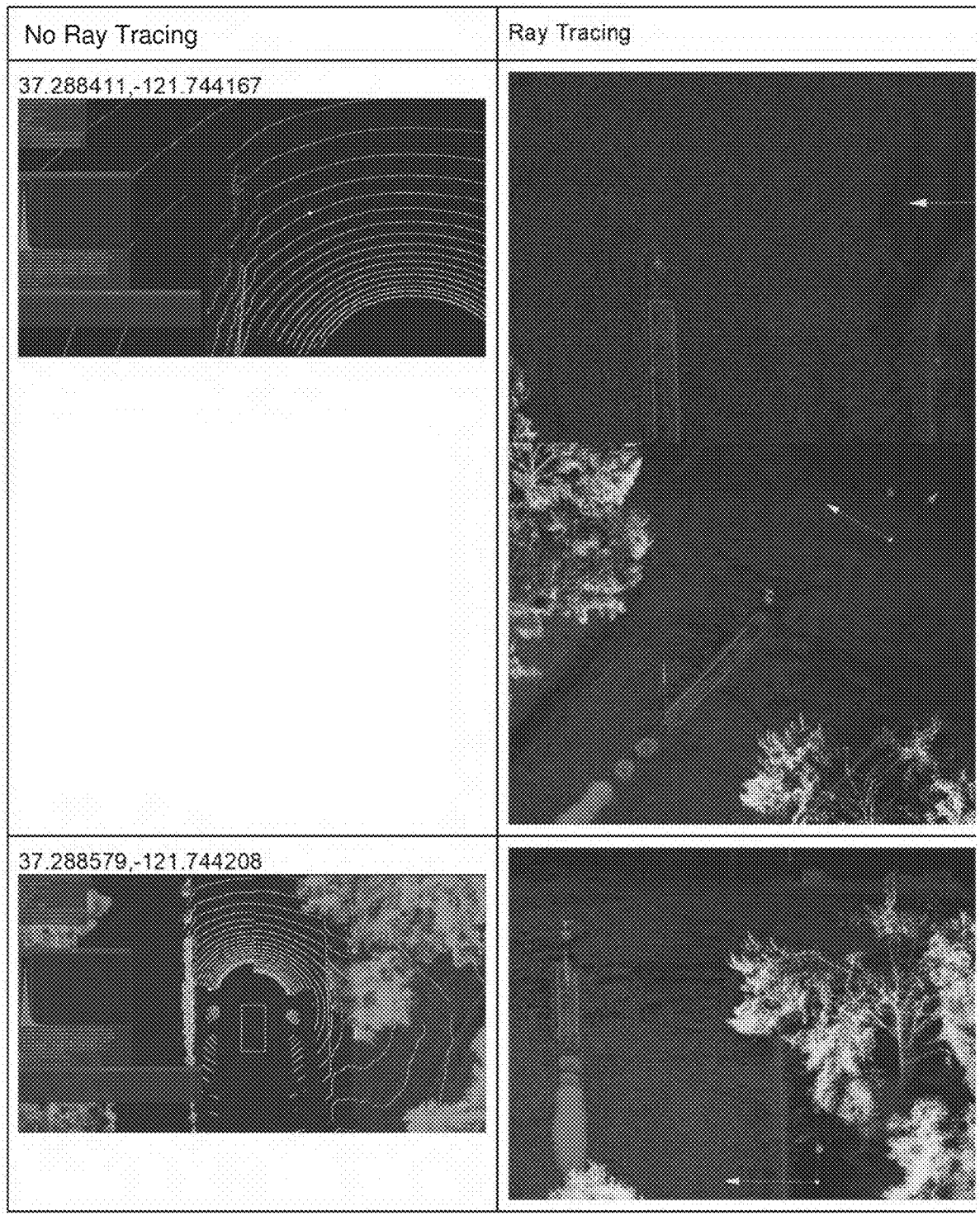
Figure 15C:
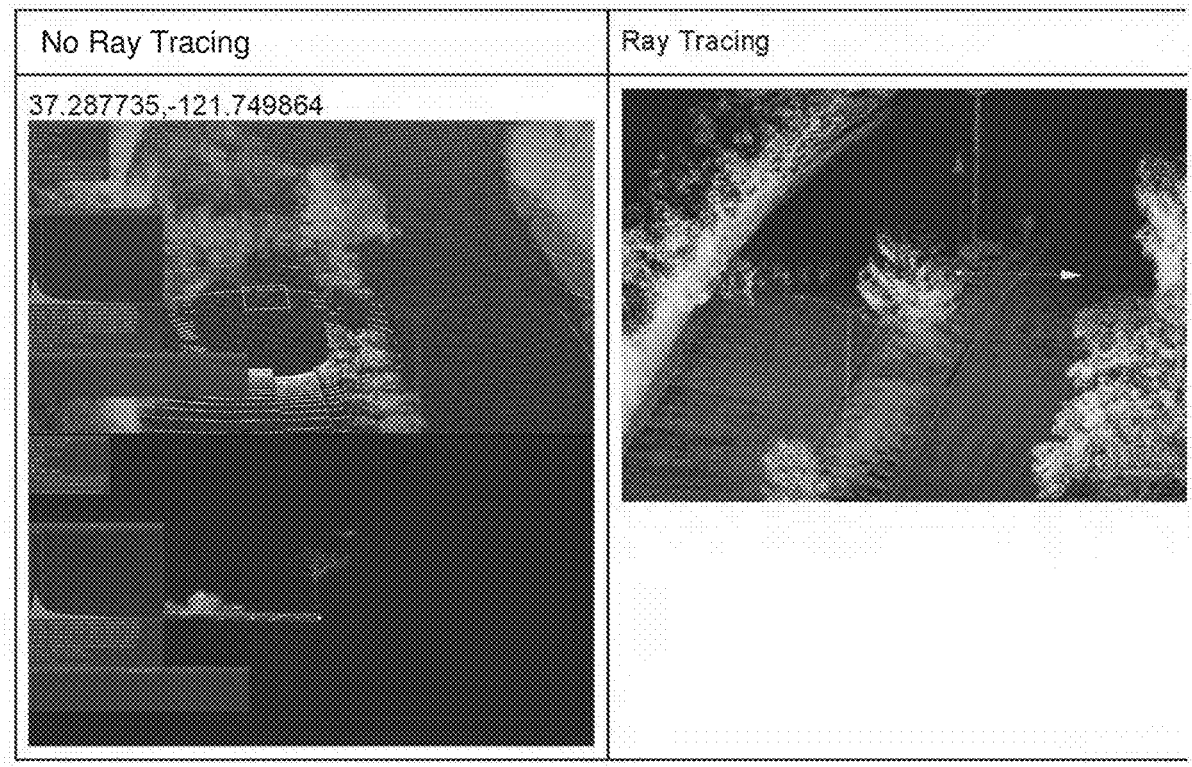
Figure 15D:
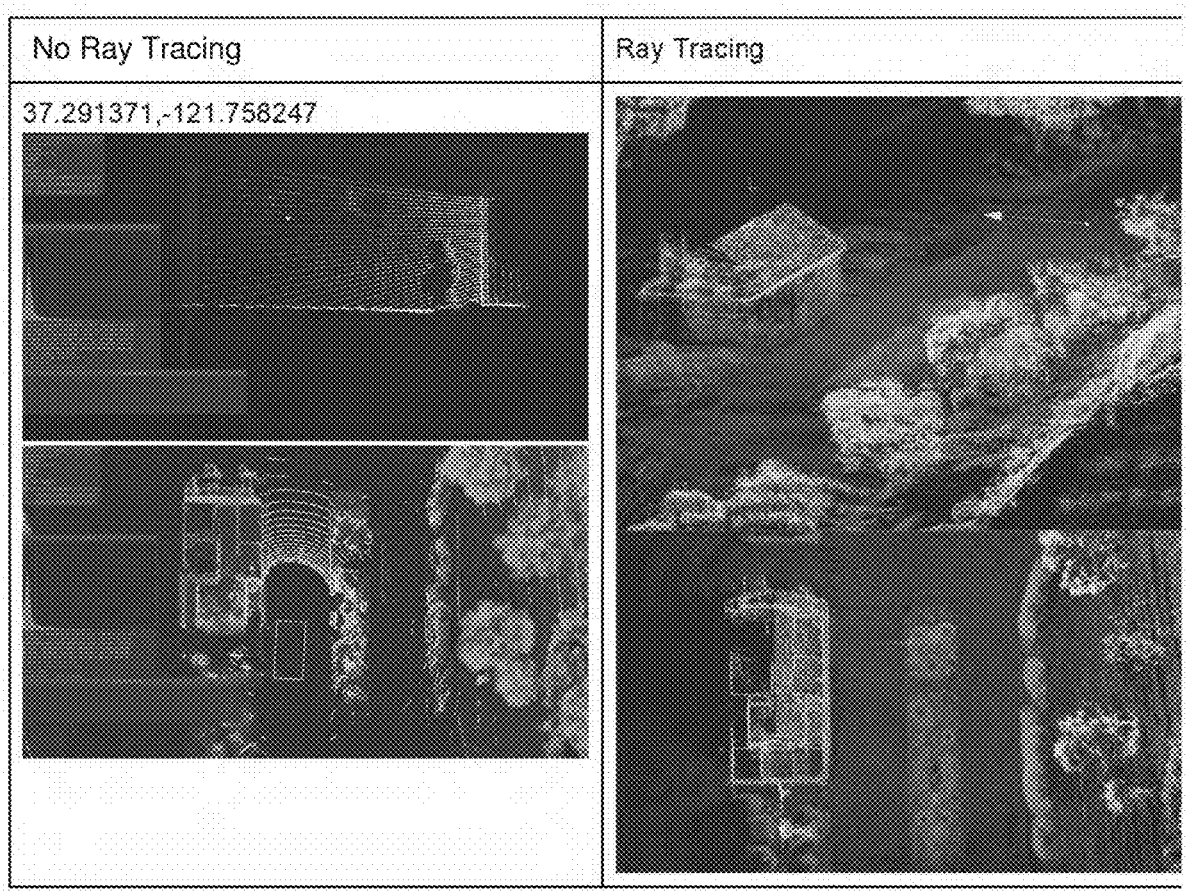
Figure 15E:
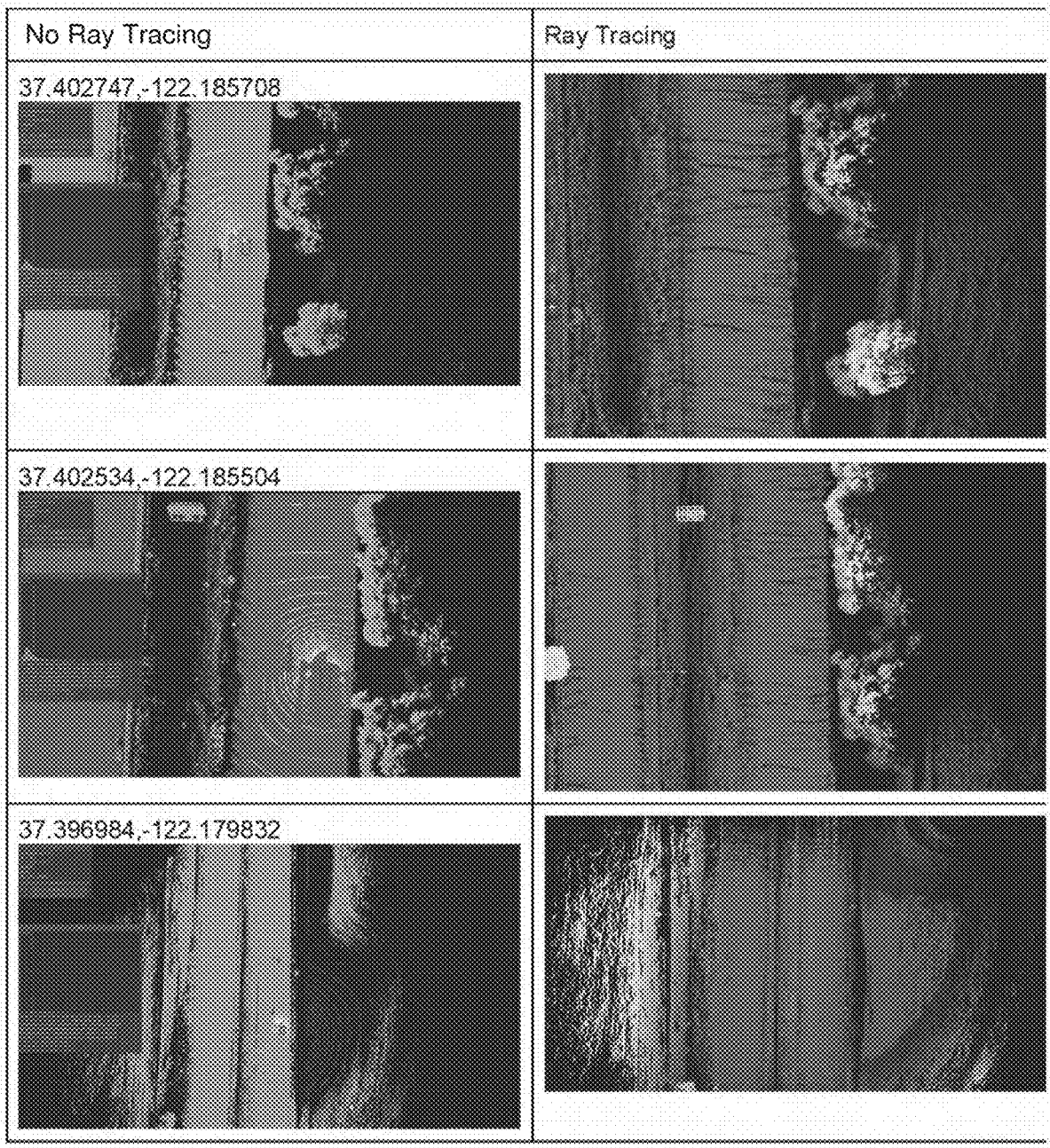

FIG. 14 illustrates modeling of motion of lidar sensors according to one embodiment. Given a range r and intensity from a lidar sample and calibration parameters (e.g., rotation correction hc, distance correction dc, vertical offset correction v, and horizontal offset correction h), the ray tracing module 470 may determine (x, y, z) coordinates of a point in a local sector coordinate system (e.g., local scanner coordinate frame) and solve for pitch and yaw using the following equations:

$$x=((r+dc)\cos(\text{pitch})-v\sin(\text{pitch}))\sin(\text{yaw}-hc)-h\cos(\text{yaw}-hc) \quad (1)$$

$$y=((r+dc)\cos(\text{pitch})-v\sin(\text{pitch}))\cos(\text{yaw}-hc)+h\sin(\text{yaw}-hc) \quad (2)$$

$$z=(r+dc)\sin(\text{pitch})+v\cos(\text{pitch}) \quad (3)$$

$R=r+dc,$ $cp=\cos(\text{pitch}),$ $sp=\sin(\text{pitch}),$ $cy=\cos(\text{yaw}-hc),$ $sy=\sin(\text{yaw}-hc)$ Ray Tracing Examples FIGS. 15A, 15B, 15C, 15D, and 15E illustrate images processed using ray tracing according to various embodiments. As shown in figures, example images processed with ray tracing (e.g., using any of the previously described embodiments) may include less noise in comparison with example images processed using no ray tracing. For example, the example images processed using no ray tracing include ephemeral points representing motion of objects detected by the lidar sensor (e.g., noise artifacts). The example images processed using ray tracing may filter the ephemeral points.

Figure 16A:
FIGS. 16A, 16B, 16C, 16D, 16E, and 16F illustrate images processed using ray tracing according to various embodiments.
Figure 16B:
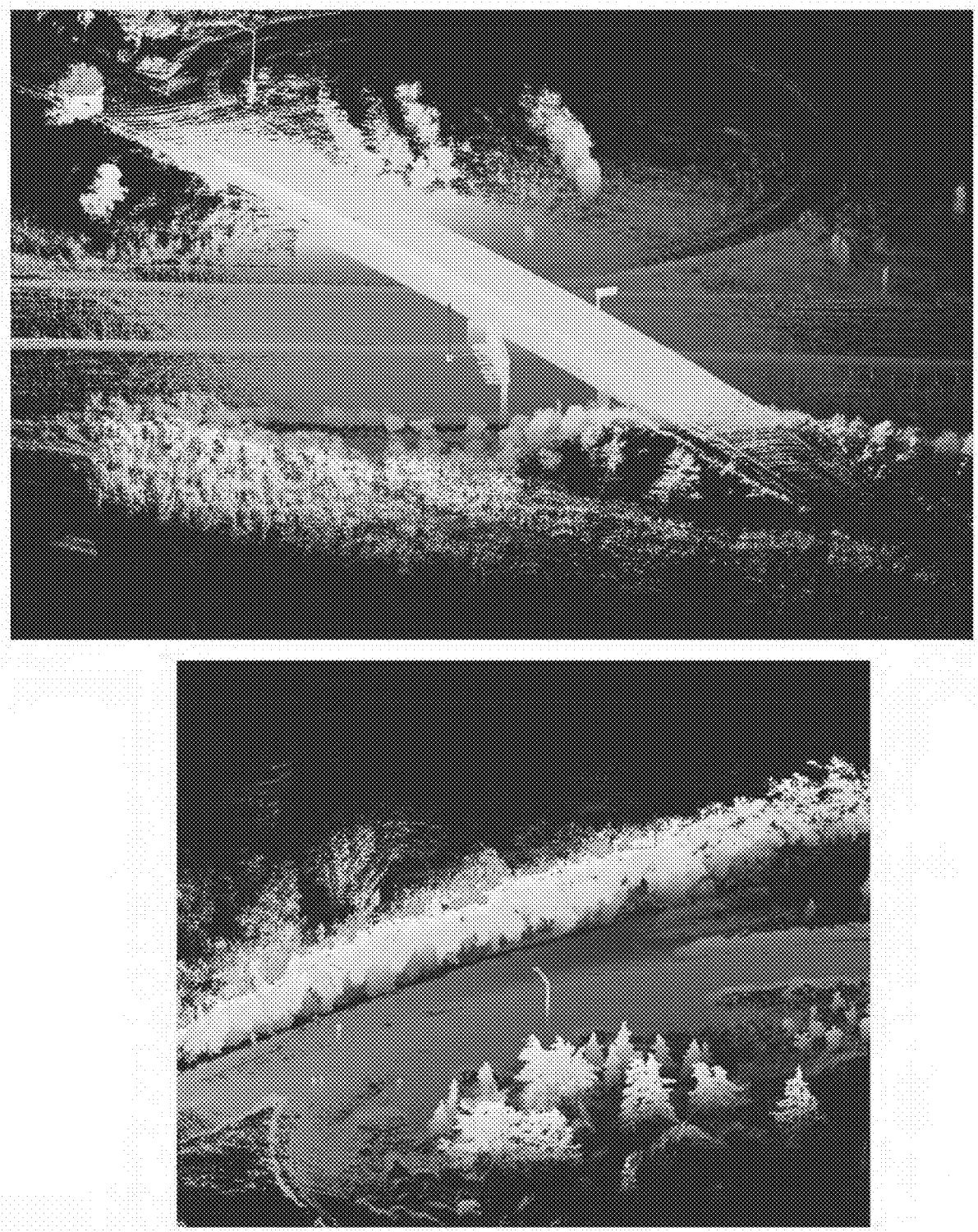
Figure 16C:
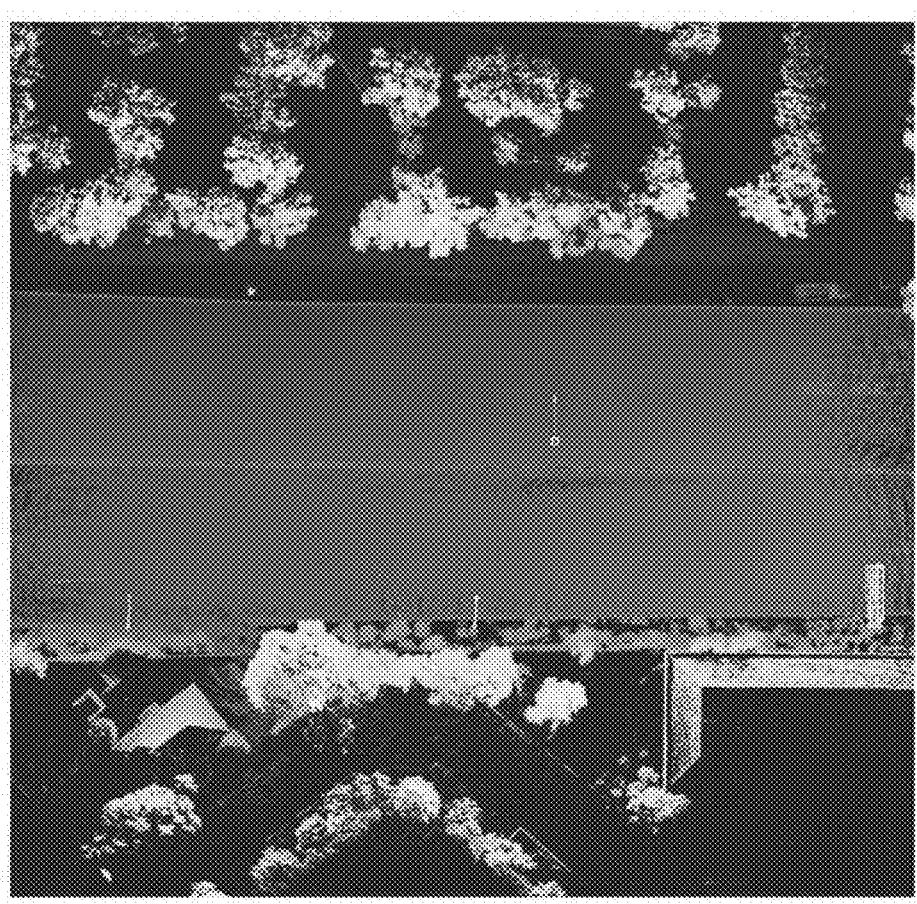
Figure 16D:
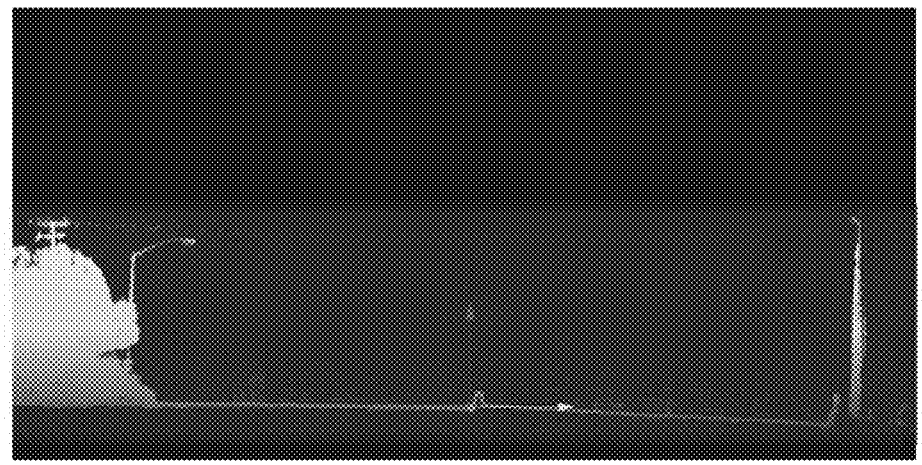
Figure 16D:
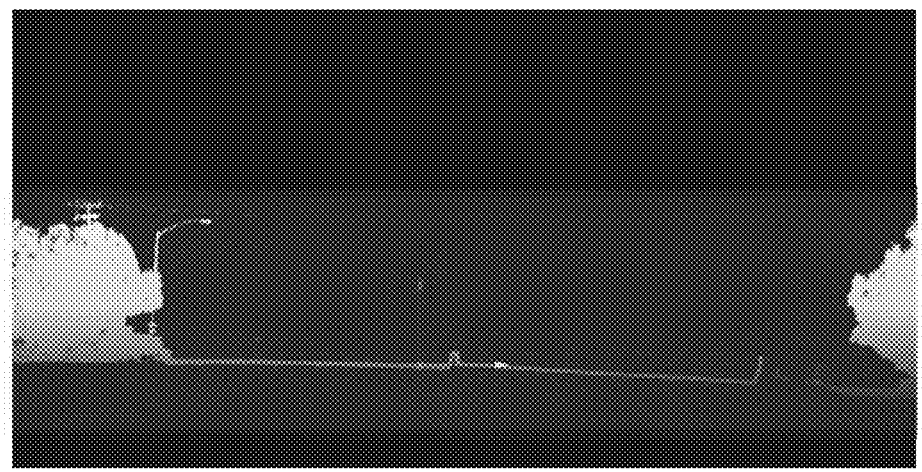
Figure 16E:
Figure 16F:
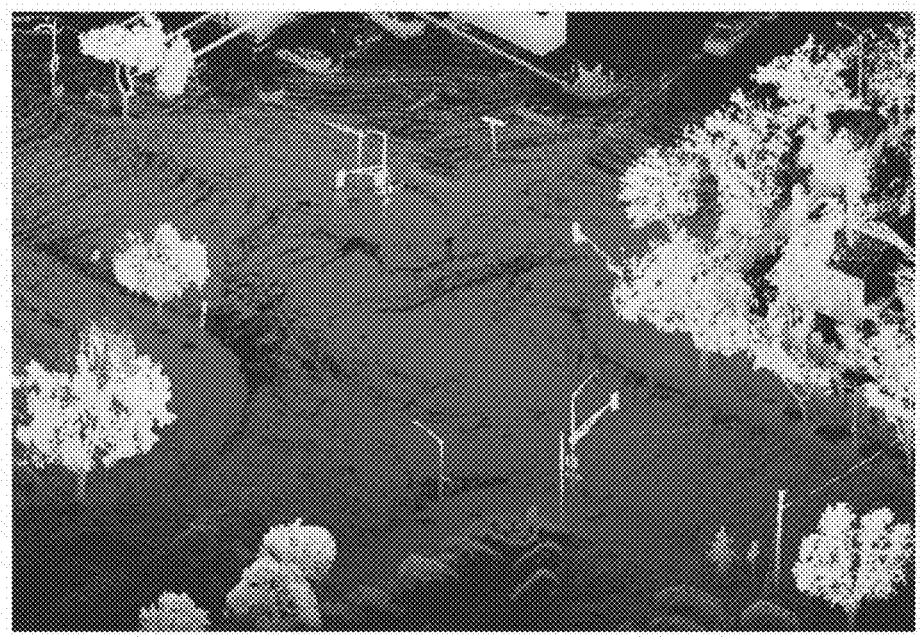
Figure 16F:

FIGS. 16A, 16B, 16C, 16D, 16E, and 16F illustrate images processed using ray tracing according to various embodiments. FIG. 16A shows an example image of a road intersection. FIG. 16B shows example images of an overpass. FIG. 16C shows an example image of a highway. FIG. 16D shows an example image on top processed using a 0.001 radian threshold for yaw and another example image on bottom processed using a 0.0015 radian threshold for yaw. FIG. 16E shows an example image of a parking lot. FIG. 16F shows example images of roads.

Computing Machine Architecture

Figure 17:
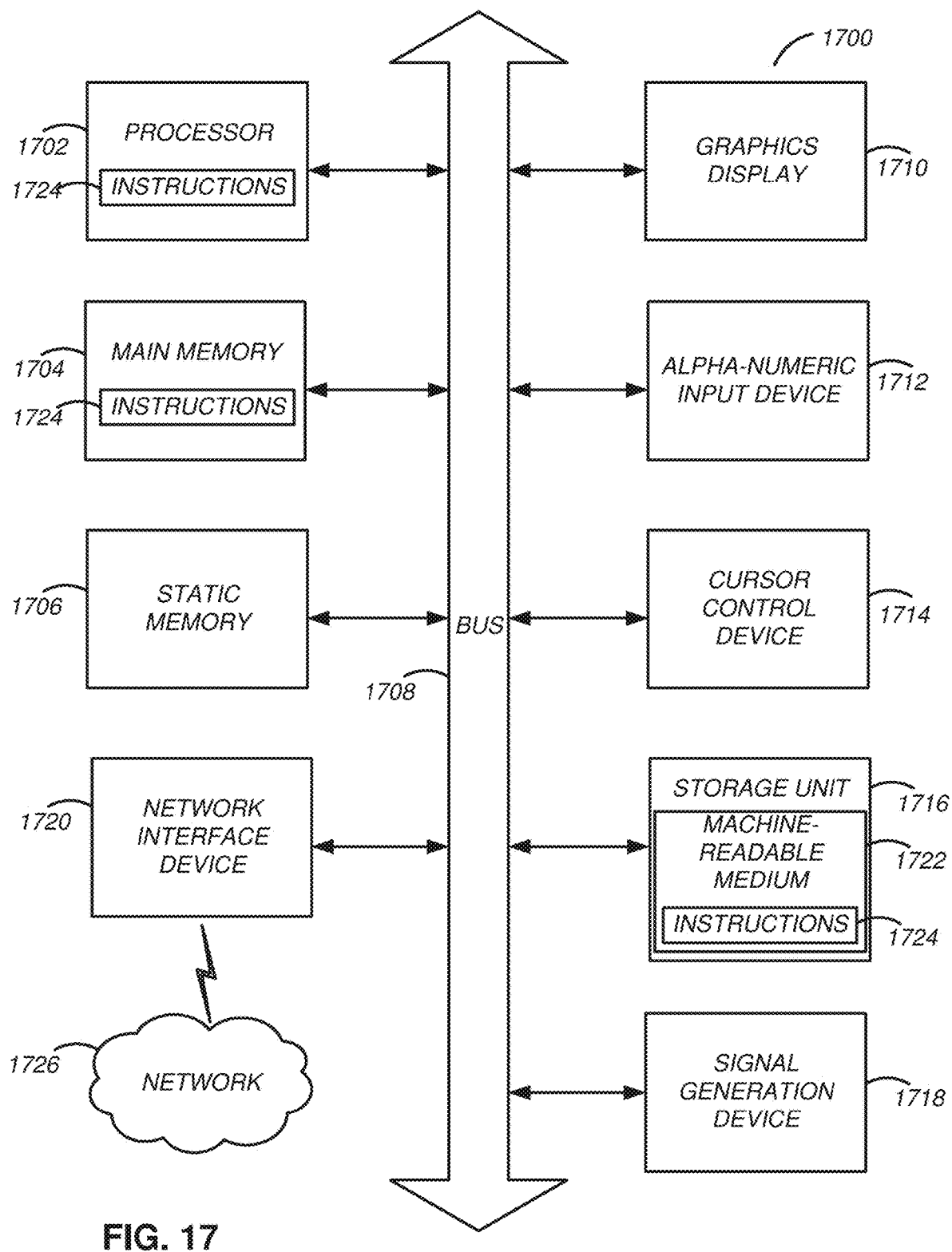
FIG. 17 illustrates an embodiment of a computing machine that can read instructions from a machine-readable medium and execute the instructions in a processor or controller.

FIG. 17 is a block diagram illustrating components of an example machine able to read instructions from a machine-readable medium and execute them in a processor (or controller). Specifically, FIG. 17 shows a diagrammatic representation of a machine in the example form of a computer system 1700 within which instructions 1724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1724 (sequential or otherwise) that specify actions to be taken by that machine. Further, while only a single machine is illustrated, the term "machine" shall also be taken to include any collection of machines that individually or jointly execute instructions 1724 to perform any one or more of the methodologies discussed herein.

The example computer system 1700 includes a processor 1702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1704, and a static memory 1706, which are configured to communicate with each other via a bus 1708. The computer system 1700 may further include graphics display unit 1710 (e.g., a plasma display panel (PDP), a liquid crystal display (LCD), a projector, or a cathode ray tube (CRT)). The computer system 1700 may also include alphanumeric input device 1712 (e.g., a keyboard), a cursor control device 1714 (e.g., a mouse, a trackball, a joystick, a motion sensor, or other pointing instrument), a storage unit 1716, a signal generation device 1718 (e.g., a speaker), and a network interface device 1720, which also are configured to communicate via the bus 1708.

The storage unit 1716 includes a machine-readable medium 1722 on which is stored instructions 1724 (e.g., software) embodying any one or more of the methodologies or functions described herein. The instructions 1724 (e.g., software) may also reside, completely or at least partially, within the main memory 1704 or within the processor 1702 (e.g., within a processor's cache memory) during execution thereof by the computer system 1700, the main memory 1704 and the processor 1702 also constituting machine-readable media. The instructions 1724 (e.g., software) may be transmitted or received over a network 1726 via the network interface device 1720.

While machine-readable medium 1722 is shown in an example embodiment to be a single medium, the term "machine-readable medium" should be taken to include a single medium or multiple media (e.g., a centralized or distributed database, or associated caches and servers) able to store instructions (e.g., instructions 1724). The term "machine-readable medium" shall also be taken to include any medium that is capable of storing instructions (e.g., instructions 1724) for execution by the machine and that cause the machine to perform any one or more of the methodologies disclosed herein. The term "machine-readable medium" includes, but is not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

The invention claimed is:

1. A method comprising:
   identifying one or more voxel cells that correspond to a three-dimensional (3D) space as occupied voxel cells that indicate presence of at least one object, one or more individual occupied voxel cells being identified in response to one or more light detection and ranging (lidar) samples obtained using a lidar sensor indicating presence of a respective object at a respective location that corresponds to a respective occupied voxel cell of the one or more individual occupied voxel cells;
   filtering a set of one or more occupied voxel cells, comprising, for each respective occupied voxel cell of at least one occupied voxel cell of the set of one or more occupied voxel cells:
      projecting the respective occupied voxel cell into a range image to obtain a projected range of the occupied voxel cell, the range image corresponding to a lidar scan performed using the lidar sensor and the projected range indicating a first distance from the lidar sensor to a first location within the 3D space, the first location corresponding to the respective occupied voxel cell;
      determining a pixel range that corresponds to a lidar sample corresponding to the range image, the pixel range indicating a second distance from the lidar sensor to a second location within the 3D space, the second location corresponding to the lidar sample; and
      removing the respective occupied voxel cell from the set of one or more occupied voxel cells responsive to the projected range being less than or equal to the pixel range;
   generating a high-definition (HD) map including a point-cloud using the filtered set of occupied voxel cells; and
   providing the HD map for navigation of a vehicle.

2. The method of claim 1, further comprising:
   determining motion of the at least one object relative to the lidar sensor using one or more unwinding transforms.

3. The method of claim 2, wherein the determining the motion of the at least one object comprises:
   determining rotation of the at least one object relative to the lidar sensor using the one or more unwinding transforms.

4. The method of claim 1, further comprising:
   determining vehicle control instructions based at least on the HD map; and
   providing the vehicle control instructions to the vehicle for navigation.

5. The method of claim 1, further comprising:
   performing calibration of a position of the lidar sensor using one or more calibration parameters.

6. The method of claim 5, wherein the calibration parameters include one or more of: rotation correction, distance correction, vertical offset correction, or horizontal offset correction.

7. A method comprising:
   determining one or more occupied voxel cells in a three-dimensional (3D) space using one or more light detection and ranging (lidar) samples of a plurality of lidar samples obtained using a lidar sensor, one or more aligned poses that respectively correspond to the one or more lidar samples, and one or more unwinding transforms that respectively correspond to the one or more lidar samples;
   filtering a set of one or more occupied voxel cells, the filtering comprising, for each respective occupied voxel cell of at least one occupied voxel cell of the set of one or more occupied voxel cells:
      projecting the respective occupied voxel cell into a range image to obtain a projected range of the occupied voxel cell, the range image corresponding to a lidar scan performed using the lidar sensor and the projected range indicating a first distance from the lidar sensor to a first location within the 3D space, the first location corresponding to the respective occupied voxel cell;
      determining a pixel range that corresponds to a lidar sample corresponding to the range image, the pixel range indicating a second distance from the lidar sensor to a second location within the 3D space, the second location corresponding to the lidar sample; and
      removing the respective occupied voxel cell from the set of one or more occupied voxel cells responsive to the projected range being less than or equal to the pixel range; and
   generating a map comprising a point-cloud using the set of filtered occupied voxel cells.

8. The method of claim 7, wherein the lidar sample is identified based at least on the second location being within a threshold distance of the first location.

9. The method of claim 7, wherein the respective occupied voxel cell is identified based at least on the first location being within a threshold distance of the second location.

10. The method of claim 7, wherein at least one of the one or more of the occupied voxel cells respectively comprises projections of one or more lidar samples according to the one or more aligned poses and the one or more unwinding transforms.

11. The method of claim 7, wherein the lidar sensor is placed on a vehicle, and wherein the one or more occupied voxel cells indicate presence of at least one object in a vicinity of the vehicle.

12. The method of claim 11, further comprising:
   determining motion of the at least one object relative to the lidar sensor using the one or more unwinding transforms.

13. The method of claim 12, wherein the determining the motion of the at least one object comprises:
   determining rotation of the at least one object relative to the lidar sensor using the one or more unwinding transforms.

14. The method of claim 11, further comprising:
   determining vehicle control instructions based at least on the map; and
   providing the vehicle control instructions to the vehicle for navigation.

15. The method of claim 7, further comprising:
   performing calibration of a position of the lidar sensor using one or more calibration parameters.

16. The method of claim 15, wherein the calibration parameters include one or more of: rotation correction, distance correction, vertical offset correction, or horizontal offset correction.

17. A processor comprising one or more processing units to perform operations comprising:
  receiving a plurality of light detection and ranging (lidar) samples, the plurality of lidar samples being obtained using a lidar sensor mounted on an autonomous vehicle;
  determining one or more occupied voxel cells in a three-dimensional (3D) space using the lidar samples, one or more individual respective occupied voxel cells being identified in response to one or more of the lidar samples indicating presence of a respective object at a respective location that corresponds to a respective occupied voxel cell of the one or more individual occupied voxel cells;
  filtering a set of one or more occupied voxel cells, comprising, for each respective occupied voxel cell of at least one occupied voxel cell of the set of one or more occupied voxel cells:
    projecting the respective occupied voxel cell into a range image to obtain a projected range of the occupied voxel cell, the range image corresponding to a lidar scan performed using the lidar sensor and the projected range indicating a first distance from the lidar sensor to a first location within the 3D space, the first location corresponding to the respective occupied voxel cell;
    determining a pixel range that corresponds to a lidar sample corresponding to the range image, the pixel range indicating a second distance from the lidar sensor to a second location within the 3D space, the second location corresponding to the lidar sample; and
    removing the respective occupied voxel cell from the set of one or more occupied voxel cells responsive to the projected range being less than or equal to the pixel range;
  generating a high-definition (HD) map comprising a point-cloud using the filtered set of occupied voxel cells; and
  providing the HD map for navigation of the autonomous vehicle.

18. The processor of claim 17, wherein the operations further comprise:
  determining motion of at least one object relative to the lidar sensor using one or more unwinding transforms.

19. The processor of claim 18, wherein the determining the motion of the at least one object comprises:
  determining rotation of the at least one object relative to the lidar sensor using the one or more unwinding transforms.

20. The processor of claim 17, wherein the operations further comprise:
  determining vehicle control instructions based at least on the HD map; and
  providing the vehicle control instructions to the vehicle for navigation.

21. A system comprising:
  one or more processors to cause the system to perform operations, the operations comprising:
    receiving a plurality of light detection and ranging (lidar) samples, the plurality of lidar samples being obtained using a lidar sensor;
    determining one or more occupied voxel cells in a three-dimensional (3D) space using the lidar samples, one or more individual respective occupied voxel cells being identified in response to one or more of the lidar samples indicating presence of a respective object at a respective location that corresponds to a respective occupied voxel cell of the one or more individual occupied voxel cells;
    filtering a set of one or more occupied voxel cells, comprising, for each respective occupied voxel cell of at least one occupied voxel cell of the set of one or more occupied voxel cells:
      projecting the respective occupied voxel cell into a range image to obtain a projected range of the occupied voxel cell, the range image corresponding to a lidar scan performed using the lidar sensor and the projected range indicating a first distance from the lidar sensor to a first location within the 3D space, the first location corresponding to the respective occupied voxel cell;
      determining a pixel range that corresponds to a lidar sample corresponding to the range image, the pixel range indicating a second distance from the lidar sensor to a second location within the 3D space, the second location corresponding to the lidar sample; and
      removing the respective occupied voxel cell from the set of one or more occupied voxel cells responsive to the projected range being less than or equal to the pixel range;
    generating a high-definition (HD) map comprising a point-cloud using the filtered set of occupied voxel cells; and
    providing the HD map for navigation of a first vehicle.

22. The system of claim 21, wherein the lidar sensor is placed on a second vehicle, and wherein the set of occupied voxel cells indicate presence of at least one object in a vicinity of the second vehicle.

23. The system of claim 22, wherein the operations further comprise:
  determining motion of the at least one object relative to the lidar sensor using one or more unwinding transforms.

24. The computer system of claim 23, wherein the determining the motion of the at least one object comprises:
  determining rotation of the at least one object relative to the lidar sensor using the one or more unwinding transforms.

25. The system of claim 21, wherein the operations further comprise:
  determining vehicle control instructions based at least on the HD map; and
  providing the vehicle control instructions to the first vehicle for navigation.

* * * * *